US012587367B2

(12) United States Patent
Panshin

(10) Patent No.: US 12,587,367 B2
(45) Date of Patent: Mar. 24, 2026

(54) AUTHENTICATION OF LOGIC CIRCUITRY PACKAGES

(71) Applicant: Hewlett-Packard Development Company, L.P., Spring, TX (US)

(72) Inventor: Stephen D. Panshin, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/696,264

(22) PCT Filed: Oct. 7, 2021

(86) PCT No.: PCT/US2021/054006
§ 371 (c)(1),
(2) Date: Mar. 27, 2024

(87) PCT Pub. No.: WO2023/059327
PCT Pub. Date: Apr. 13, 2023

(65) Prior Publication Data
US 2024/0396716 A1 Nov. 28, 2024

(51) Int. Cl.
*H04L 9/08* (2006.01)
(52) U.S. Cl.
CPC ................................. *H04L 9/0825* (2013.01)
(58) Field of Classification Search
CPC ............................. H04L 9/0825; G06F 21/44
See application file for complete search history.

(56) References Cited

U.S. PATENT DOCUMENTS

| | | | |
|---|---|---|---|
| 5,440,635 A | 8/1995 | Bellovin et al. | |
| 6,122,742 A | 9/2000 | Young et al. | |
| 6,389,136 B1 | 5/2002 | Young et al. | |
| 7,757,084 B2 | 7/2010 | Walmsley et al. | |
| 8,136,168 B2 | 3/2012 | Cheng et al. | |
| 8,667,285 B2 | 3/2014 | Coulier et al. | |
| 9,032,204 B2 * | 5/2015 | Byrd ..................... | H04L 9/3268 |
| | | | 705/76 |
| 9,191,376 B2 | 11/2015 | Phillips et al. | |
| 2002/0029200 A1 | 3/2002 | Dulin et al. | |
| 2002/0108041 A1 | 8/2002 | Watanabe et al. | |

(Continued)

FOREIGN PATENT DOCUMENTS

AU 2009203032 A1 * 8/2009

OTHER PUBLICATIONS

TCG, "TCG EK Credential Profile For TPM Family 2.0; Level 0", Specification Version 2.0, TCG Public Review, 2014, 37 pages.

(Continued)

*Primary Examiner* — Mohammed Waliullah
(74) *Attorney, Agent, or Firm* — Foley & Lardner LLP

(57) ABSTRACT

A logic circuitry package includes a logic circuit and an interface to communicate with a host logic circuit. The logic circuit includes a memory arrangement storing an asymmetric key, and/or a certificate corresponding to the asymmetric key. The logic circuit is configured to transmit, to the host logic circuit, the certificate; receive, from the host logic circuit, a static signature request comprising challenge data; and/or, transmit, to the host logic circuit, a signature computed based on the challenge data and the asymmetric key in response to the static signature request.

19 Claims, 14 Drawing Sheets

(56) References Cited

U.S. PATENT DOCUMENTS

| | | | |
|---|---|---|---|
| 2002/0165912 A1 | 11/2002 | Wenocur et al. | |
| 2003/0005317 A1 | 1/2003 | Audebert et al. | |
| 2003/0070092 A1* | 4/2003 | Hawkes | H04L 9/0891 |
| | | | 726/4 |
| 2003/0131229 A1 | 7/2003 | Gladney | |
| 2005/0195975 A1 | 9/2005 | Kawakita | |
| 2006/0212699 A1 | 9/2006 | Makofka | |
| 2009/0249074 A1 | 10/2009 | Madhavan et al. | |
| 2010/0195824 A1 | 8/2010 | Lin et al. | |
| 2011/0109938 A1* | 5/2011 | Refstrup | G06F 21/57 |
| | | | 358/1.15 |
| 2011/0208972 A1 | 8/2011 | Liu et al. | |
| 2012/0044286 A1* | 2/2012 | Yearworth | G06Q 40/00 |
| | | | 347/6 |
| 2013/0246785 A1 | 9/2013 | Buckley et al. | |
| 2014/0281554 A1 | 9/2014 | Maletsky et al. | |
| 2018/0219678 A1* | 8/2018 | Medvinsky | H04L 9/3268 |
| 2019/0386821 A1 | 12/2019 | Fiege et al. | |
| 2022/0365539 A1 | 11/2022 | Molinari et al. | |
| 2022/0368539 A1 | 11/2022 | Wright et al. | |
| 2024/0269985 A1* | 8/2024 | Jeran | G03G 15/556 |
| 2025/0077633 A1* | 3/2025 | Chen | G06F 21/31 |

OTHER PUBLICATIONS

Zhao, Yong, "Secure Tamper Resistant Authentication for Anti-Counterfeit Applications" NXP, Sep. 2018, AMF-TRD-T3152, 46 pages.

Ito, T, et al., "General Purpose Extended Key Usage (EKU) for Document Signing X.509 Certificates", draft-ito-documentsigning-eku-00, Internet Engineering, retrieved from < https://datatracker.ietf.org/doc/html/draft-ito-documentsigning-eku-00>, Apr. 1, 2021, pp. 1-5.

* cited by examiner

800

802

IN A SECURE COMMUNICATION SESSION, USING THE SYMMETRIC KEY, GENERATE SYMMETRICALLY AUTHENTICATED RESPONSES TO SYMMETRICALLY AUTHENTICATED COMMANDS OF THE PRINT APPARATUS LOGIC CIRCUIT

804

WITHIN THE SECURE COMMUNICATION SESSION, TRANSMIT, TO THE PRINT APPARATUS LOGIC CIRCUIT, THE CERTIFICATE

806

WITHIN THE SECURE COMMUNICATION SESSION, RECEIVE, FROM THE PRINT APPARATUS LOGIC CIRCUIT, A STATIC SIGNATURE REQUEST COMPRISING CHALLENGE DATA

808

WITHIN THE SECURE COMMUNICATION SESSION, TRANSMIT, TO THE PRINT APPARATUS LOGIC CIRCUIT, A SIGNATURE COMPUTED BASED ON THE CHALLENGE DATA AND THE ASYMMETRIC KEY IN RESPONSE TO THE STATIC SIGNATURE REQUEST

FIG. 8A

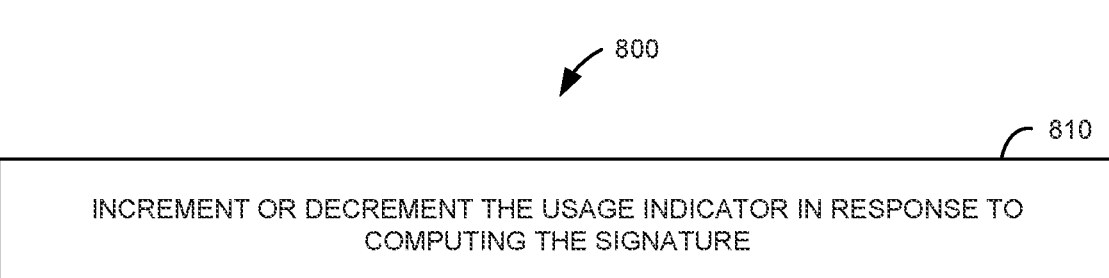

800

810

INCREMENT OR DECREMENT THE USAGE INDICATOR IN RESPONSE TO COMPUTING THE SIGNATURE

FIG. 8B

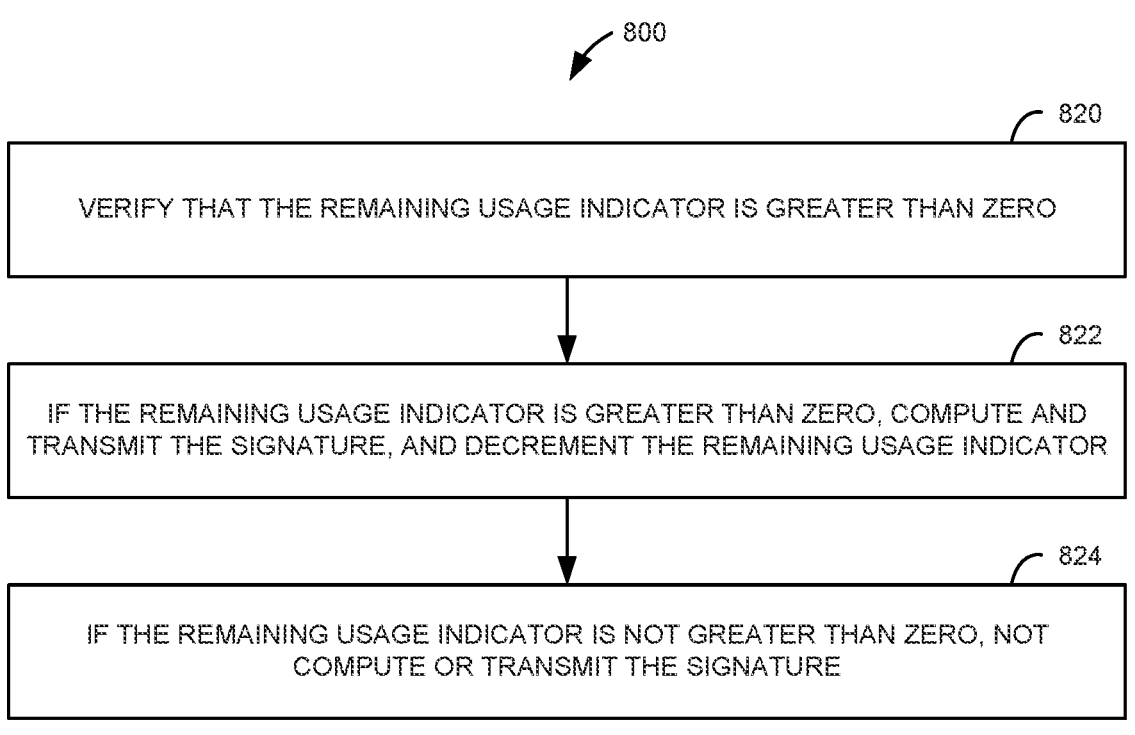

800

820

VERIFY THAT THE REMAINING USAGE INDICATOR IS GREATER THAN ZERO

822

IF THE REMAINING USAGE INDICATOR IS GREATER THAN ZERO, COMPUTE AND TRANSMIT THE SIGNATURE, AND DECREMENT THE REMAINING USAGE INDICATOR

824

IF THE REMAINING USAGE INDICATOR IS NOT GREATER THAN ZERO, NOT COMPUTE OR TRANSMIT THE SIGNATURE

FIG. 8F

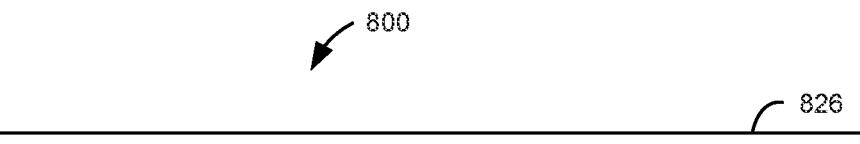

800

826

IN RESPONSE TO AT LEAST ONE REQUEST, TRANSMIT THE PLURALITY OF CERTIFICATES, THE PLURALITY OF KEY IDS, AND/OR THE PLURALITY OF USAGE INDICATORS WITHIN THE SECURE COMMUNICATION SESSION

FIG. 8G

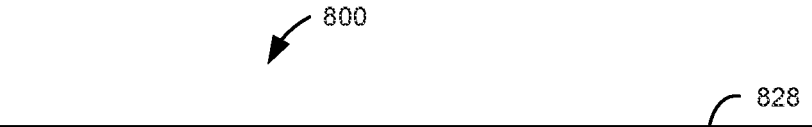

800

828

FOR EACH SECURE COMMUNICATION SESSION, GENERATE A SESSION KEY BASED ON THE SYMMETRIC KEY, THE SESSION KEY USED TO GENERATE THE SYMMETRICALLY AUTHENTICATED RESPONSES TO THE SYMMETRICALLY AUTHENTICATED COMMANDS, THE SYMMETRIC KEY BEING A BASE KEY AND THE SESSION KEY BEING NEWLY GENERATED FOR EACH SECURE COMMUNICATION SESSION

FIG. 8H

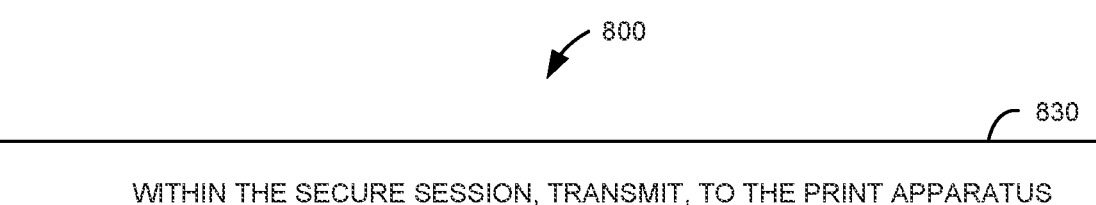

WITHIN THE SECURE SESSION, TRANSMIT, TO THE PRINT APPARATUS LOGIC CIRCUIT, THE AT LEAST ONE CAPABILITY

Fig. 8I

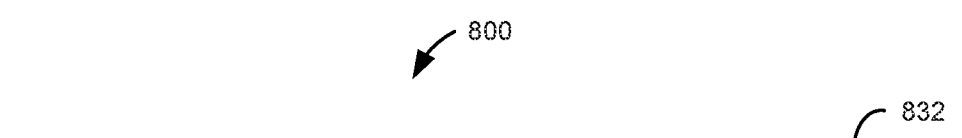

WITHIN THE SECURE SESSION, TRANSMIT, TO THE PRINT APPARATUS LOGIC CIRCUIT, AN ERROR MESSAGE IN RESPONSE TO THE STATIC SIGNATURE REQUEST IN RESPONSE TO THE USAGE INDICATOR EQUALING ZERO AND/OR THE CORRESPONDING CAPABILITY NOT INDICATING A STATIC SIGNATURE GENERATION CAPABILITY

FIG. 8J

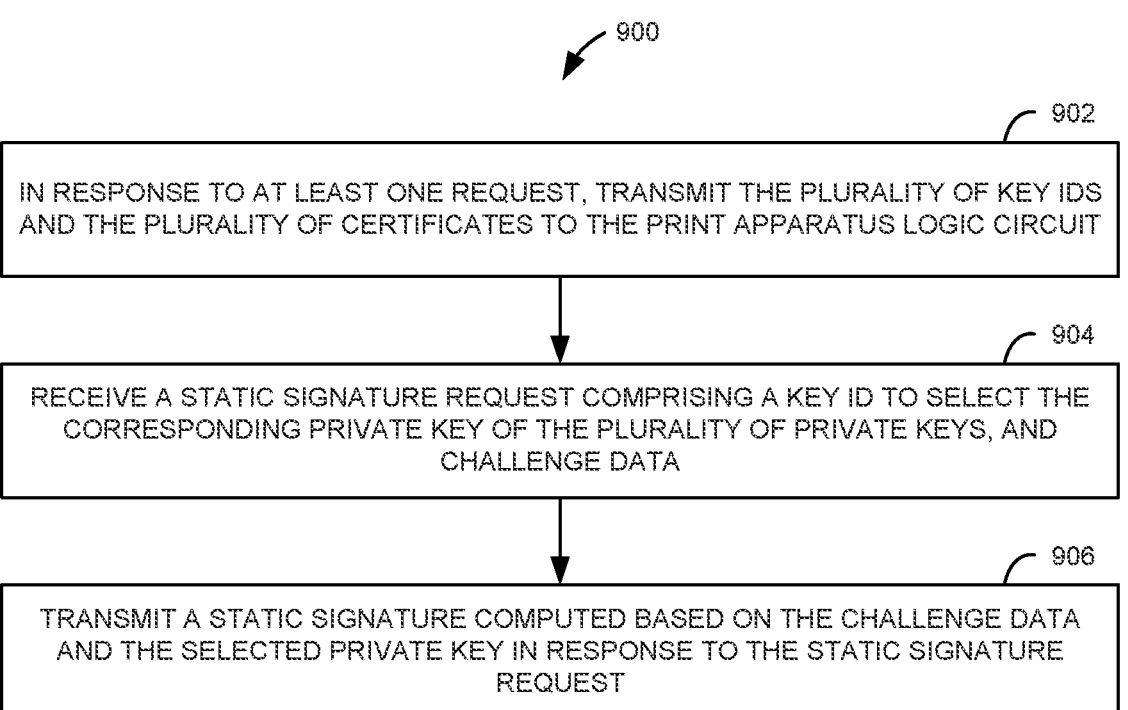

IN RESPONSE TO AT LEAST ONE REQUEST, TRANSMIT THE PLURALITY OF KEY IDS AND THE PLURALITY OF CERTIFICATES TO THE PRINT APPARATUS LOGIC CIRCUIT

RECEIVE A STATIC SIGNATURE REQUEST COMPRISING A KEY ID TO SELECT THE CORRESPONDING PRIVATE KEY OF THE PLURALITY OF PRIVATE KEYS, AND CHALLENGE DATA

TRANSMIT A STATIC SIGNATURE COMPUTED BASED ON THE CHALLENGE DATA AND THE SELECTED PRIVATE KEY IN RESPONSE TO THE STATIC SIGNATURE REQUEST

FIG. 9A

900

908

BASED UPON THE SYMMETRIC BASE KEY, GENERATE SYMMETRICALLY AUTHENTICATED RESPONSES, INCLUDING THE KEY IDS, CERTIFICATES, AND STATIC SIGNATURE, IN RESPONSE TO SYMMETRICALLY AUTHENTICATED COMMANDS OF THE PRINT APPARATUS LOGIC CIRCUIT

FIG. 9B

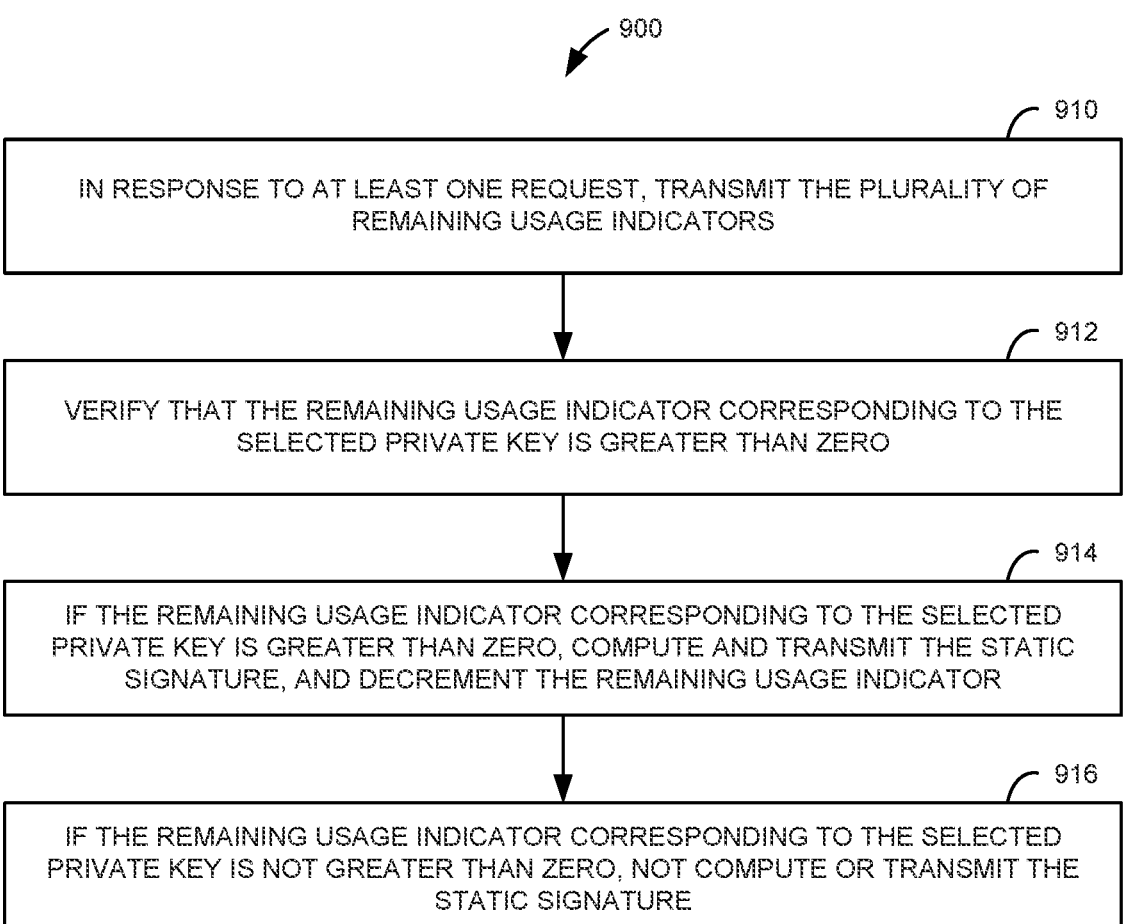

900

910

IN RESPONSE TO AT LEAST ONE REQUEST, TRANSMIT THE PLURALITY OF REMAINING USAGE INDICATORS

912

VERIFY THAT THE REMAINING USAGE INDICATOR CORRESPONDING TO THE SELECTED PRIVATE KEY IS GREATER THAN ZERO

914

IF THE REMAINING USAGE INDICATOR CORRESPONDING TO THE SELECTED PRIVATE KEY IS GREATER THAN ZERO, COMPUTE AND TRANSMIT THE STATIC SIGNATURE, AND DECREMENT THE REMAINING USAGE INDICATOR

916

IF THE REMAINING USAGE INDICATOR CORRESPONDING TO THE SELECTED PRIVATE KEY IS NOT GREATER THAN ZERO, NOT COMPUTE OR TRANSMIT THE STATIC SIGNATURE

FIG. 9C

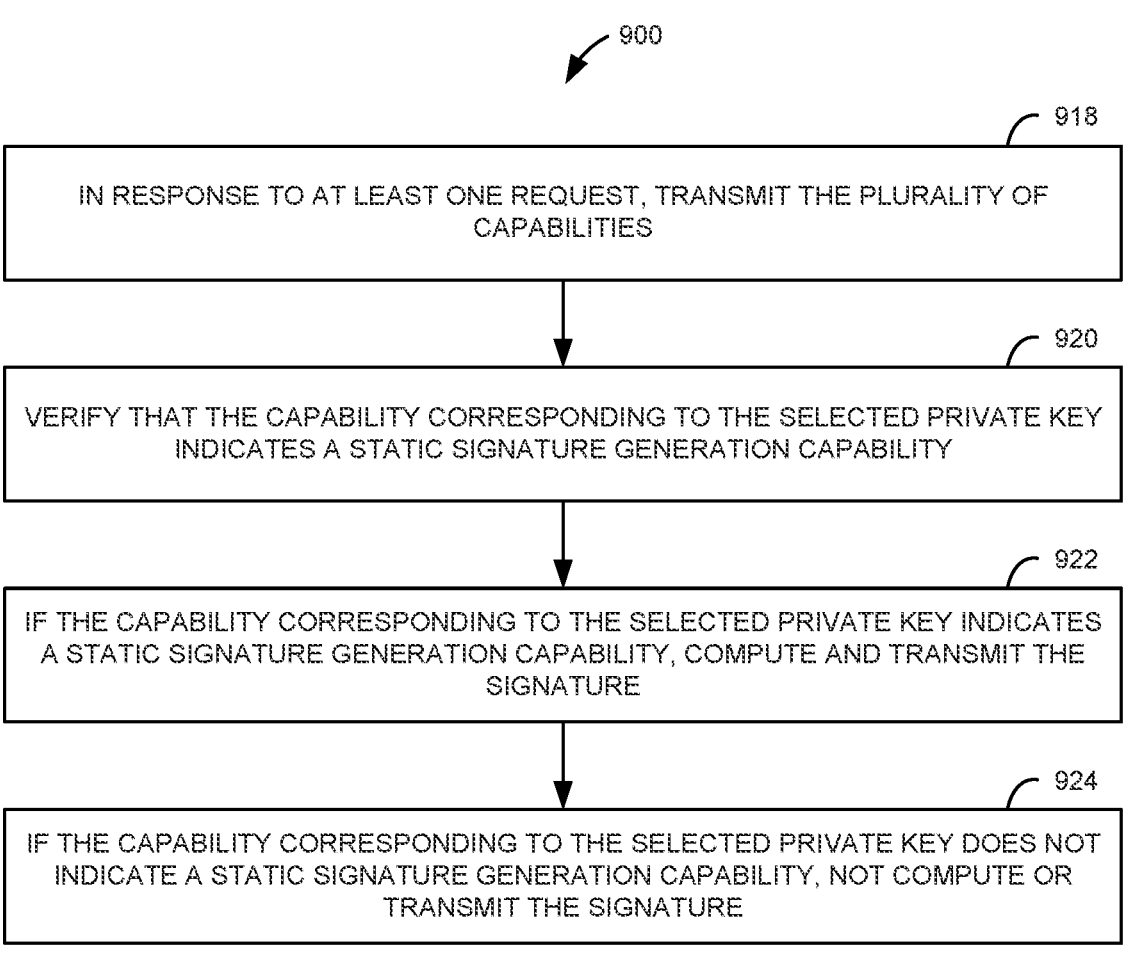

900

918

IN RESPONSE TO AT LEAST ONE REQUEST, TRANSMIT THE PLURALITY OF CAPABILITIES

920

VERIFY THAT THE CAPABILITY CORRESPONDING TO THE SELECTED PRIVATE KEY INDICATES A STATIC SIGNATURE GENERATION CAPABILITY

922

IF THE CAPABILITY CORRESPONDING TO THE SELECTED PRIVATE KEY INDICATES A STATIC SIGNATURE GENERATION CAPABILITY, COMPUTE AND TRANSMIT THE SIGNATURE

924

IF THE CAPABILITY CORRESPONDING TO THE SELECTED PRIVATE KEY DOES NOT INDICATE A STATIC SIGNATURE GENERATION CAPABILITY, NOT COMPUTE OR TRANSMIT THE SIGNATURE

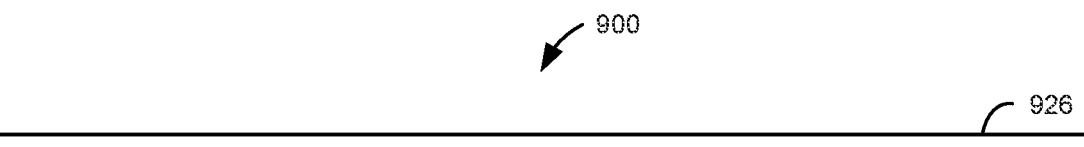

BASED UPON THE SYMMETRIC BASE KEY, GENERATE SYMMETRICALLY AUTHENTICATED RESPONSES, INCLUDING THE PLURALITY OF USAGE INDICATORS AND/OR THE PLURALITY OF CAPABILITIES, IN RESPONSE TO SYMMETRICALLY AUTHENTICATED COMMANDS OF THE PRINT APPARATUS LOGIC CIRCUIT

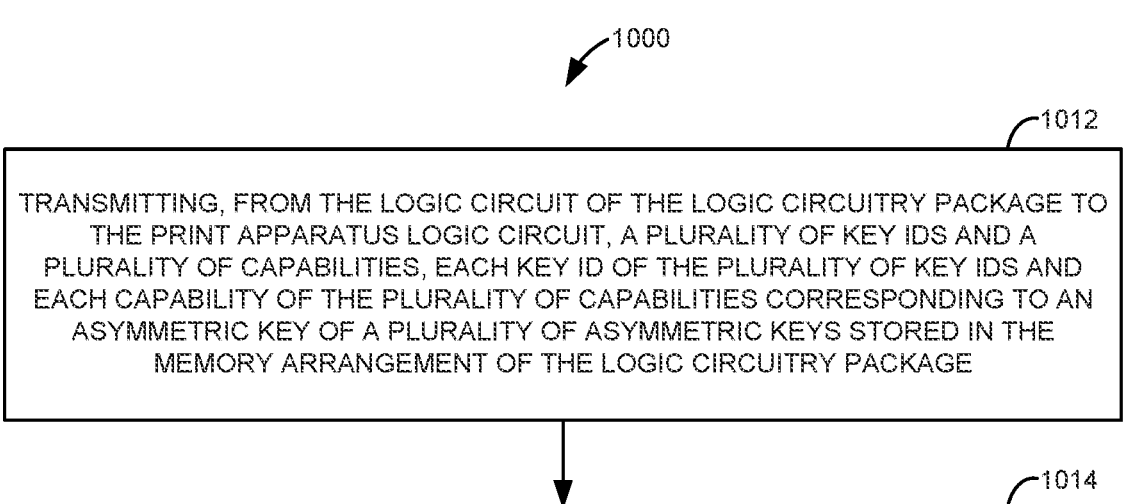

1012

TRANSMITTING, FROM THE LOGIC CIRCUIT OF THE LOGIC CIRCUITRY PACKAGE TO THE PRINT APPARATUS LOGIC CIRCUIT, A PLURALITY OF KEY IDS AND A PLURALITY OF CAPABILITIES, EACH KEY ID OF THE PLURALITY OF KEY IDS AND EACH CAPABILITY OF THE PLURALITY OF CAPABILITIES CORRESPONDING TO AN ASYMMETRIC KEY OF A PLURALITY OF ASYMMETRIC KEYS STORED IN THE MEMORY ARRANGEMENT OF THE LOGIC CIRCUITRY PACKAGE

1014

RECEIVING, AT THE LOGIC CIRCUIT OF THE LOGIC CIRCUITRY PACKAGE FROM THE PRINT APPARATUS LOGIC CIRCUIT, A STATIC SIGNATURE REQUEST COMPRISING A SELECTED KEY ID OF THE PLURALITY OF KEY IDS AND THE CHALLENGE DATA, WHEREIN COMPUTING THE SIGNATURE COMPRISES COMPUTING THE SIGNATURE BASED ON THE CHALLENGE DATA AND AN ASYMMETRIC KEY OF THE PLURALITY OF ASYMMETRIC KEYS CORRESPONDING TO THE SELECTED KEY ID

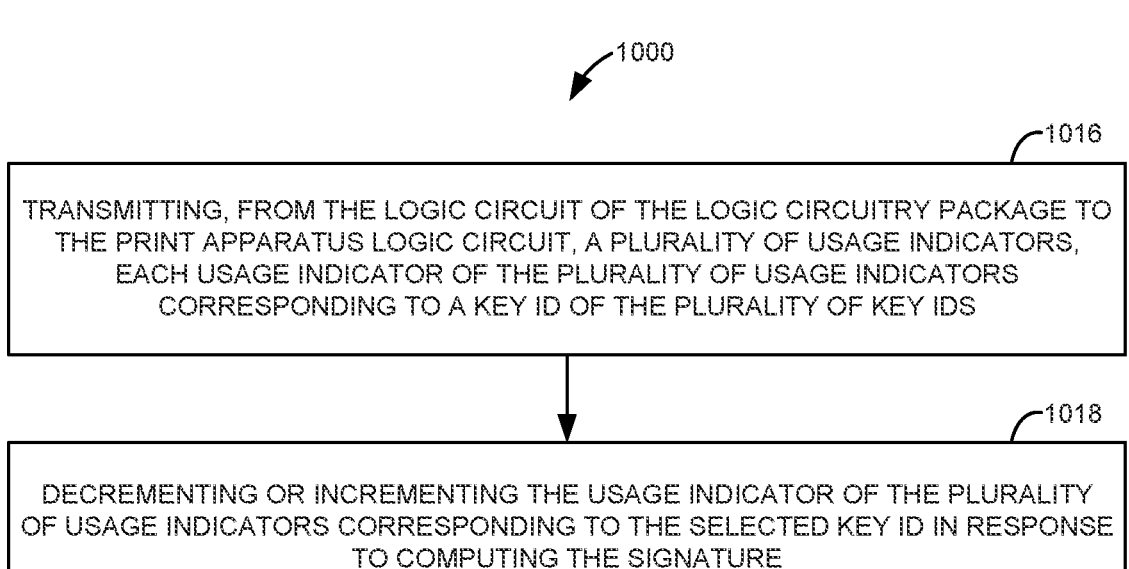

1016

TRANSMITTING, FROM THE LOGIC CIRCUIT OF THE LOGIC CIRCUITRY PACKAGE TO THE PRINT APPARATUS LOGIC CIRCUIT, A PLURALITY OF USAGE INDICATORS, EACH USAGE INDICATOR OF THE PLURALITY OF USAGE INDICATORS CORRESPONDING TO A KEY ID OF THE PLURALITY OF KEY IDS

1018

DECREMENTING OR INCREMENTING THE USAGE INDICATOR OF THE PLURALITY OF USAGE INDICATORS CORRESPONDING TO THE SELECTED KEY ID IN RESPONSE TO COMPUTING THE SIGNATURE

FIG. 10C

AUTHENTICATION OF LOGIC CIRCUITRY PACKAGES

CROSS-REFERENCE TO RELATED APPLICATIONS

This application is a U.S. National Stage Patent Application under 35 U.S.C. § 371 of PCT/US2021/054006, filed Oct. 7, 2021, which is hereby incorporated by reference in its entirety.

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analog communications may be used.

Some two-dimensional (2D) and three-dimensional (3D) printing systems include one or more replaceable print apparatus components, such as print material containers (e.g., inkjet cartridges, toner cartridges, ink supplies, 3D printing agent supplies, build material supplies, etc.), inkjet printhead assemblies, and the like. In some examples, logic circuitry associated with the replaceable print apparatus component(s) communicates with logic circuitry of the print apparatus in which they are installed, for example communicating information such as their identity, capabilities, status, and the like. Similarly, other communication systems use logic circuits to connect to a host logic circuit, of which general examples include network communication systems, life science applications, automotive industry, the internet of things, etc.

Many instances of logic circuitry include at least one authentication function for secure communication.

BRIEF DESCRIPTION OF THE DRAWINGS

FIGS. 8A-8J are flow diagrams illustrating example methods that may be carried out by a logic circuit.

FIGS. 9A-9E are flow diagrams illustrating other example methods that may be carried out by a logic circuit.

FIGS. 10A-10C are flow diagrams illustrating example methods for operating a printing system.

DETAILED DESCRIPTION

Figure 1:
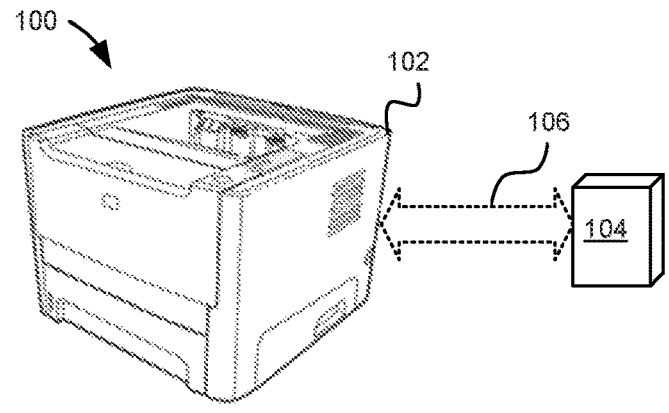
FIG. 1 illustrates one example of a printing system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that each individual feature or combination of features of the various examples described herein may be combined, in part or whole, with each other individual feature or combination of features.

Some examples of applications described herein are in the context of print apparatus. Not all the examples, however, are limited to such applications, and at least some of the principles set out herein may be used in other contexts.

Certain third parties succeed in reverse engineering (parts of) Original Equipment Manufacturer (OEM) logic circuits to connect to OEM print apparatuses. In one practical example, the logic circuits may include microcontrollers attached, or configured to be attached, to print consumable cartridges, where the print apparatus logic circuits may include printer controllers and/or printer microcontrollers. In many instances, only symmetric authentication is used. Printer apparatus firmware could be attacked to obtain the symmetric master keys, which could then be used to emulate individual logic circuits. Combining or adding different types of authentication can be relatively inefficient and costly.

In other examples, logic circuits do not need to be associated with print components or host print apparatus. Logic circuits can be used in conjunction with any Micro-Electrical Mechanical System, Lab-on-Chip, mobile computing device, and/or Life Science application. A wide range of applications require a logic circuitry package such as a microcontroller to securely connect to a host, physically and/or communicatively. The logic circuitry packages may connect to any type of host, for example any computing system, server, car system, apparatus for domestic use, access control systems, etc. While many examples of this disclosure involve logic circuitry packages and logic circuits for print apparatus components to connect to a host print apparatus logic circuit, the features of logic circuitry packages can be applied outside of the field of printing, by itself or in association with any component, to connect to any type of host logic circuit, not necessarily associated with a print apparatus component or print apparatus, respectively. Hence, where this disclosure refers to a print apparatus and print apparatus component (or cartridge or container), or the like, the apparatus can be any apparatus and the component can be any component. Examples of this disclosure allow for a host logic circuit to securely identify and authenticate a logic circuit associated with a host, and some examples of this disclosure may allow for the logic circuit to securely identify and/or authenticate the host.

Public keys using X.509 certificates require a separate certificate to be validated per public key, and may require external libraries for parsing and validating the certificates.

In certain examples, Inter-integrated Circuit ($I^2C$, or I2C, which notation is adopted herein) protocol allows at least one 'leader' (commonly referred to as a 'master') integrated circuit (IC) to communicate with at least one 'follower' (commonly referred to as a 'slave') IC, for example via a bus. I2C, and other communications protocols, communicate data according to a clock period. For example, a voltage signal may be generated, where the value of the voltage is associated with data. For example, a voltage value above X volts may indicate a logic "1" whereas a voltage value below X volts may indicate a logic "0", where X is a predetermined numerical value. By generating an appropriate voltage in each of a series of clock periods, data can be communicated via a bus or another communication link.

Certain example print material containers have follower logic that utilize I2C communications, although in other examples, other forms of digital or analog communications could also be used. In the example of I2C communication, a leader IC may generally be provided as part of the print apparatus (which may be referred to as the 'host') and a replaceable print apparatus component would comprise a 'follower' IC, although this need not be the case in all examples. There may be a plurality of follower ICs connected to an I2C communication link or bus (for example, containers of different colors of print agent). The follower IC(s) may include a processor to perform data operations before responding to requests from logic circuitry of the print system. In certain examples, the follower IC, or logic circuitry package, of this disclosure may be connected to or integrated with any print apparatus component that can be or is connected to or integrated with a print apparatus. For example, the logic circuitry package or follower IC of this disclosure may be connected to a non-replaceable print apparatus component.

Communications between print apparatus and replaceable print apparatus components installed in the apparatus (and/or the respective logic circuitry thereof) may facilitate various functions. Logic circuitry within a print apparatus may receive information from logic circuitry associated with a replaceable print apparatus component via a communications interface, and/or may send commands to the replaceable print apparatus component logic circuitry, which may include commands to write data to a memory associated therewith, or to read data therefrom.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one logic circuit, or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples, the package may be directly affixed to a cartridge wall. In some examples, the package may include an interface, for example including pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface. Where more than one logic circuit is provided, these logic circuits may be connected to each other or to the interface, to communicate through the same interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component, such as a replaceable print consumable (e.g., ink, toner) cartridge. A logic circuitry package may alternatively be referred to as a logic circuitry assembly, or simply as logic circuitry or processing circuitry.

In some examples, the logic circuitry package may respond to various types of requests (or commands) from a host (e.g., a print apparatus). One type of request may include a request for data, for example identification and/or authentication information. Another type of request may be a request for a data processing action. There may be additional types of requests. In this disclosure, a command is also a type of request.

In some examples, there may be more than one device address associated with a particular logic circuitry package, which is used to address communications sent over a bus to identify the logic circuitry package which is the target of a communication (and therefore, in some examples, with a replaceable print apparatus component). In some examples, different requests are handled by different logic circuits of the package. In some examples, the different logic circuits may be associated with different device addresses. For example, cryptographically authenticated communications may be associated with secure microcontroller functions and a first I2C address, while other communications may be associated with a second and/or reconfigured I2C address. In certain examples, these other communications via the second and/or reconfigured address can be scrambled or otherwise secured, not using the key used for the secure microcontroller functions.

In at least some examples, a plurality of such logic circuitry packages (each of which may be associated with a different replaceable print apparatus component) may be connected to an I2C bus. In some examples, at least one address of the logic circuitry package may be an I2C compatible address (herein after, an I2C address), for example in accordance with an I2C protocol, to facilitate directing communications between leader to followers in accordance with the I2C protocol. For example, a standard I2C communications address may be 7 or 10 bits in length. In other examples, other forms of digital and/or analog communication can be used.

FIG. 1 illustrates one example of a printing system 100. The printing system 100 includes a print apparatus 102 in communication with logic circuitry associated with a replaceable print apparatus component 104 via a communications link 106. In some examples, the communications link 106 may include an I2C capable or compatible bus (herein after, an I2C bus). Although for clarity, the replaceable print apparatus component 104 is shown as external to the print apparatus 102, in some examples, the replaceable print apparatus component 104 may be housed within the print apparatus.

The replaceable print apparatus component 104 may include, for example, a print material container or cartridge (which could be a build material container for 3D printing, a liquid or dry toner container for 2D printing, or an ink or liquid print agent container for 2D or 3D printing), which may in some examples include a print head or other dispensing or transfer component. The print material may be a consumable print material to be consumed by dispensing or transferring. In this disclosure, a print material, print consumable, or consumable print material may be the same thing, examples of which are indicated between parentheses above. The replaceable print apparatus component 104 may, for example, contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example including print agent containers of different colors, print heads (which may be integral to the containers), or the like. In other examples, the print apparatus components 104 could include service components, for example to be replaced by service personnel, examples of which could include print heads, toner process cartridges, or logic circuitry packages by themselves to adhere to corresponding print apparatus components and communicate to a compatible print apparatus logic circuit.

Figure 2:
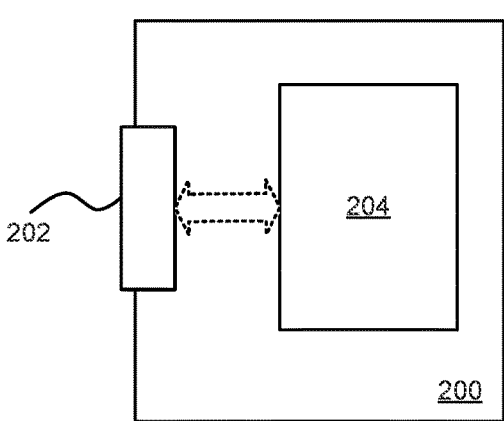
FIG. 2 illustrates one example of a replaceable print apparatus component.

FIG. 2 illustrates one example of a replaceable print apparatus component 200, which may provide the replaceable print apparatus component 104 of FIG. 1. The replaceable print apparatus component 200 includes a data interface 202 and a logic circuitry package 204. In use of the replaceable print apparatus component 200, the logic circuitry package 204 decodes data received via the data interface 202. The logic circuitry may perform other functions as set out below. The data interface 202 may include an I2C or other interface. In certain examples, the data interface 202 may be part of the same package as the logic circuitry package 204.

In some examples, the logic circuitry package 204 may be further configured to encode data for transmission via the data interface 202. In some examples, there may be more than one data interface 202 provided. In some examples, the logic circuitry package 204 may be arranged to act as a 'follower' in I2C communications.

Figure 3:
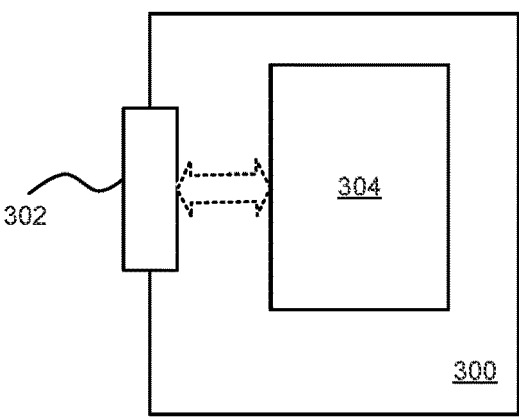
FIG. 3 illustrates one example of a print apparatus.

FIG. 3 illustrates one example of a print apparatus 300. The print apparatus 300 may provide the print apparatus 102 of FIG. 1. The print apparatus 300 may serve as a host for replaceable components. The print apparatus 300 includes an interface 302 for communicating with a replaceable print apparatus component and a print apparatus logic circuit 304, such as a controller. In some examples, the interface 302 is an I2C interface.

In some examples, the print apparatus logic circuit 304 may be configured to act as a host, or a leader, in I2C communications. The print apparatus logic circuit 304 may generate and send commands to at least one replaceable print apparatus component 200, and may receive and decode responses received therefrom. In other examples, the print apparatus logic circuit 304 may communicate with the logic circuitry package 204 using any form of digital or analog communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200. In many cases, this compatibility may be provided by the print apparatus 102, 300 as the replaceable print apparatus components 104, 200 may be relatively resource constrained in terms of their processing and/or memory capacity.

Figure 4:
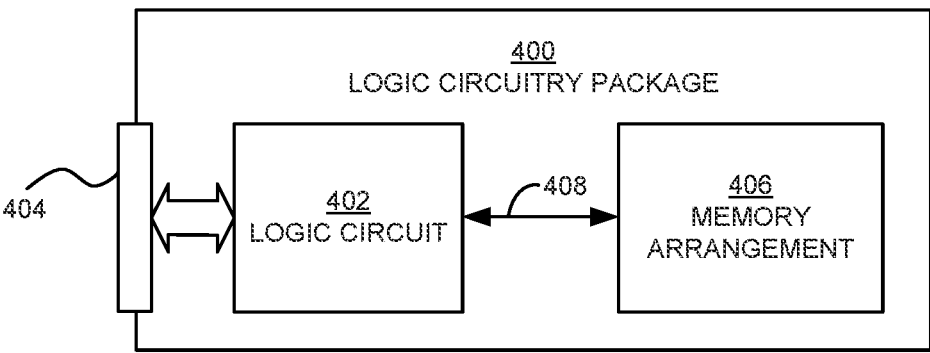
FIG. 4 illustrates one example of a logic circuitry package.

FIG. 4 illustrates one example of a logic circuitry package 400, which may for example provide the logic circuitry package 204 described in relation to FIG. 2. The logic circuitry package 400 may be associated with, or in some examples affixed to and/or be incorporated at least partially within, a replaceable print apparatus component 200.

Logic circuitry package 400 includes a logic circuit 402, an interface 404, and a memory arrangement 406. In some examples, the interface 404 is an I2C interface. Logic circuit 402 is communicatively coupled to memory arrangement 406 through a communication link 408. Memory arrangement 406 may include a single or multiple memory devices, and may include any or any combination of volatile memory (e.g., Dynamic Random Access Memory (DRAM), Static Random Access Memory (SRAM), registers, etc.) and non-volatile memory (e.g., Read Only Memory (ROM), Electrically Erasable Programmable Read Only Memory (EE-PROM), Flash, Erasable Programmable Read Only Memory (EPROM), memristor, etc.). In some examples, as described in more detail below with reference to FIGS. 6A-6C, memory arrangement 406 stores a symmetric key, an asymmetric (e.g., private) key, and a certificate corresponding to the asymmetric key. In other examples, memory arrangement 406 may alternatively, or in addition, store a plurality of private keys, a plurality of key IDs, and a plurality of certificates comprising respective public keys, where each key ID and each certificate corresponds to a respective private key. In yet other examples, memory arrangement 406 may also store a capability, a usage indicator, and/or a Cryptographic Mode of Use Attribute (CMA) corresponding to each private key and/or key ID. In this disclosure, the memory arrangement 406 may include key storage memory for the private key(s) and/or symmetric base key; attribute storage memory to be accessed by the processor and firmware of the logic circuit 402; and general purpose user memory for reading and/or writing by the print apparatus. The memory arrangement 406 may include single memory hardware with different respective key storage, attribute storage, and general purpose user access partitions, or different memory hardware components for the key storage, attribute storage, and general purpose user access. For example, key storage memory may be configured to be higher security and/or difficult to access, as compared to general purpose user memory that may be configured for fast reading and/or writing. Reference is also made to FIG. 7.

Logic circuit 402 may be configured to establish a secure communication session with a host print apparatus logic circuit based on the symmetric key stored in memory arrangement 406 in response to a request from a host print apparatus logic circuit. The secure communication session may be established based on a corresponding symmetric key stored in the host print apparatus logic circuit (e.g., by generating a session key based on a symmetric base key). In some examples, the memory arrangement 406 may store a symmetric master key, derive the master key to a base key, and then derive the base key to a session key. In some examples, the host print apparatus logic circuit may derive the symmetric base key based on a symmetric master key.

With a secure communication session established, and in response to the host print apparatus logic circuit not recognizing the logic circuit 402 (e.g., the replaceable print apparatus component including the logic circuitry package 400 is newly installed in the host printer), the host print apparatus logic circuit may query the logic circuit 402 to read the key ID, certificate, capability, usage indicator, and/or CMA corresponding to a single asymmetric key or read all or a subset of the key IDs, certificates, capabilities, usage indicators, and/or CMAs corresponding to multiple asymmetric keys stored in memory arrangement 406. The key ID(s), certificate(s), capability(s), usage indicator(s), and/or CMA(s) may be transmitted in response to a single request, multiple requests, or in response to individual requests for each key ID, certificate, capability, usage indicator, and/or CMA. The type or number of requests needed may depend upon the requested response data length.

In one example, a capability or allowed key capability, as stored in the memory arrangement 406, may correspond to a key ID. A host request to the logic circuit 402 may need to correspond to the capability. Examples of capabilities may include different signing functions supported by the logic circuit 402. The logic circuit 402 may support different signing functions, for example, generating a "static" signature or generating a "manufacturing" signature. When asymmetric (private) keys are written to a memory for the logic circuit 402, the capability corresponding to each private key may specify which signing function(s) the private key supports. This is called the key's "capability". For example, if a private key of key ID #1 only supports the manufacturing signature, the capability may indicate this. Another key capability of, say, key ID #2 may support both the static and manufacturing signatures. If Key #1 were specified in a static signature request, the logic circuit would refuse the request, but for Key ID #2 the logic circuit would transmit the requested static signature.

Within the secure communication session, the host print apparatus logic circuit may transmit a static signature request to the logic circuit 402 including a key ID corresponding to a selected asymmetric key and challenge data to authenticate the replaceable print apparatus component including the logic circuitry package 400. In some examples, the challenge data may include random data generated by the host print apparatus logic circuit and may include a length between 1 byte and 500 bytes, such as between 4 bytes and 16 bytes.

In response to the static signature request, the logic circuit 402 transmits a signature computed based on the challenge data and the selected asymmetric key (as identified by the key ID in the static signature request) to the host print apparatus logic circuit. That is, the challenge data is signed by the logic circuit 402 using the selected asymmetric key and transmitted to the host print apparatus logic circuit. The host print apparatus logic circuit then validates the signature to enable the replaceable print apparatus component including the logic circuitry package 400 to be used by the host printer, such as for printing. The usage indicator corresponding to an asymmetric key may be decremented or incremented each time the asymmetric key is used to compute a signature. When the usage indicator corresponding to an asymmetric key equals a minimum value (e.g., 0 for a decrementing usage indicator) or a maximum value (e.g., 3, 4, 5, etc., for an incrementing usage indicator) the asymmetric key may no longer be used to compute a static signature and the static signature request may be rejected. In addition, as previously described, the capability corresponding to an asymmetric key may indicate whether the corresponding key supports a static signature and/or other signatures. If a static signature request specifies an asymmetric key that does not include a static signature capability, the static signature request may be rejected.

The example logic circuits disclosed herein raise the bar for third parties to reverse engineer the logic circuits to connect to counterpart print apparatus logic circuits. In one practical example, the logic circuits may comprise microcontrollers attached, or configured to be attached, to print consumable cartridges, where the print apparatus logic circuits may comprise printer controllers and/or printer microcontrollers. If only symmetric authentication were used, then printer apparatus firmware could be attacked to obtain the symmetric master keys, which could be used to emulate individual logic circuits. In contrast with symmetric authentication, asymmetric device specific private keys may be stored on each logic circuit, which would require reverse engineering each logic circuit. Example logic circuits store both device specific symmetric keys corresponding to master/host-side symmetric keys of the print apparatus, as well as device specific asymmetric (private) keys and corresponding device specific public keys (e.g., within certificates). Intertwining asymmetric authentication within symmetric authentication sessions according to certain examples of this disclosure increases the effectiveness of the authentication compared to symmetric and asymmetric authentication used separately and not intertwined. However, certain example logic circuits of this disclosure are configured for asymmetric authentication only. In certain example logic circuits of this disclosure, the benefit of the asymmetric authentication function is relatively great, in terms of additional security, in relation to the costs or hardware needed to implement it.

Figure 5:
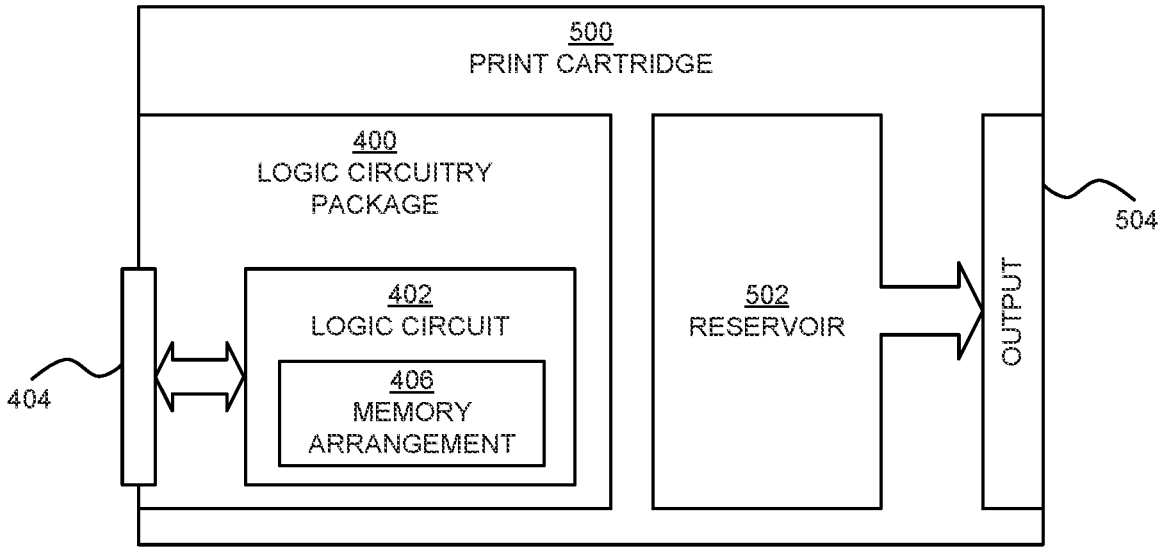
FIG. 5 illustrates one example of a replaceable print cartridge.

FIG. 5 illustrates one example of a replaceable print cartridge 500, such as a print consumable cartridge. Print cartridge 500 may provide the replaceable print apparatus component 104 of FIG. 1 or the replaceable print apparatus component 200 of FIG. 2. Print cartridge 500 includes a logic circuitry package 400 including logic circuit 402, interface 404, and memory arrangement 406. In this example, logic circuit 402 includes the memory arrangement 406. In addition, print cartridge 500 includes a reservoir 502 to hold consumable material and an output 504 to dispense the consumable material. The consumable material may include ink, dry toner, liquid toner, a 3D print agent (e.g., a print enhancement agent, a print inhibiting agent, a build powder, such as a plastic powder or a metal powder), or another suitable consumable.

Figure 6A:
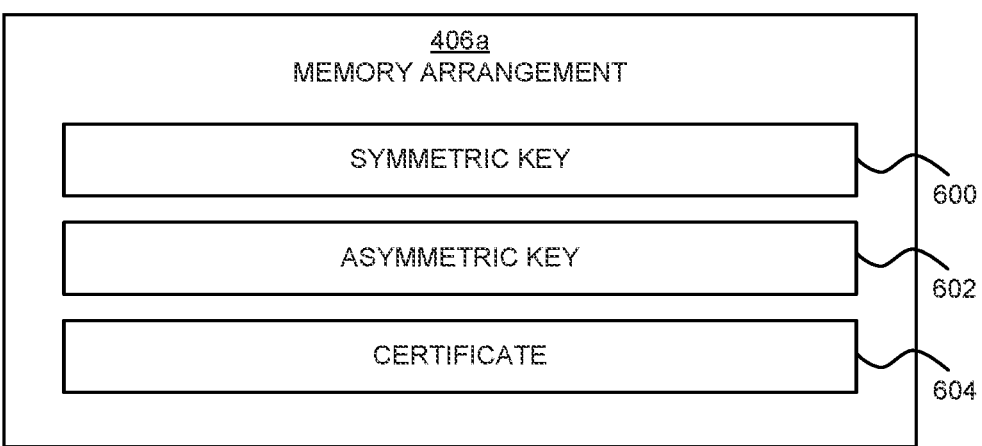
FIGS. 6A-6C illustrates example memory arrangements.
Figure 7:
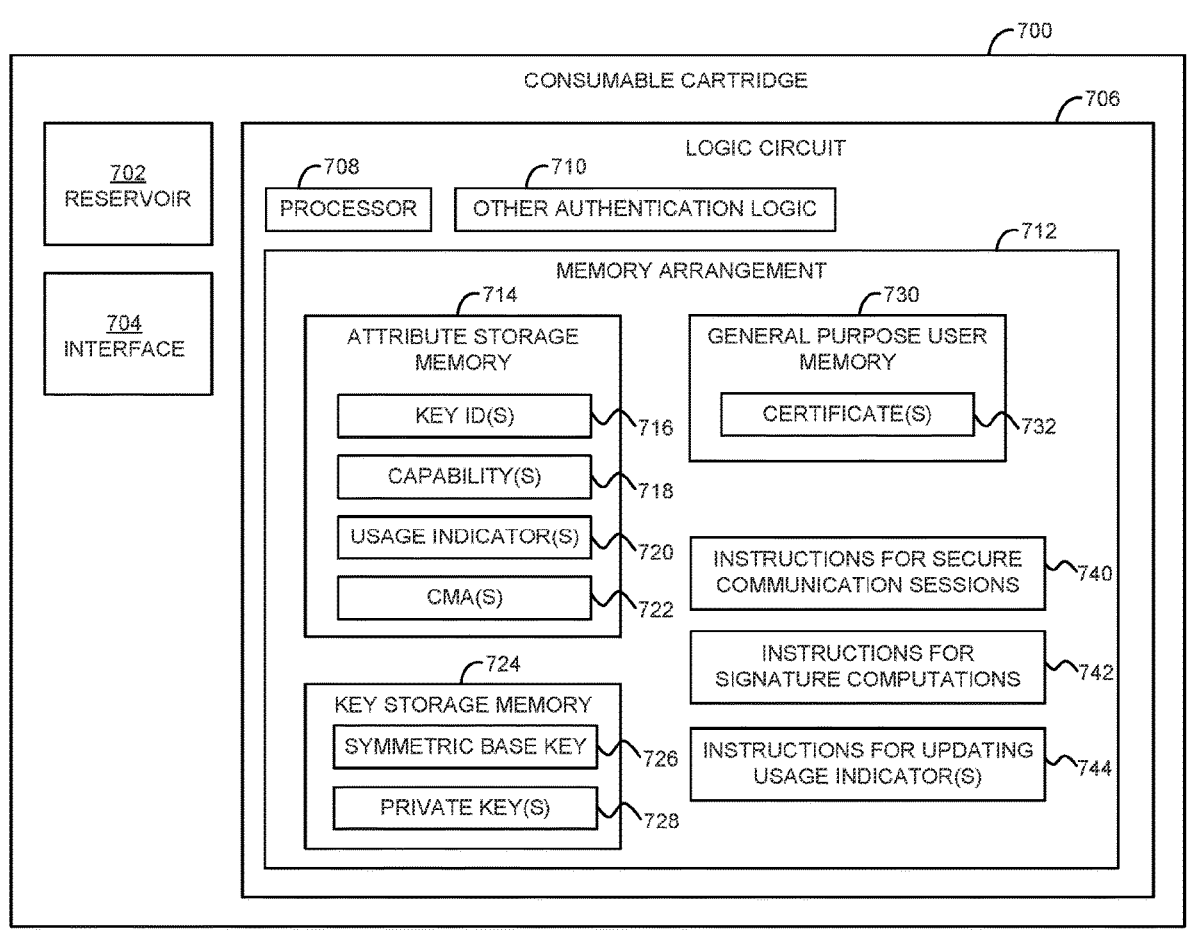
FIG. 7 illustrates one example of a consumable cartridge.

FIG. 6A illustrates one example of a memory arrangement 406a. In some examples, memory arrangement 406a may provide memory arrangement 406 of FIG. 4 or 5. Memory arrangement 406a stores a symmetric key 600, an asymmetric key 602, and a certificate 604 corresponding to the asymmetric key 602. The symmetric key 600 and the asymmetric key 602 may be stored in memory arrangement 406a in such a way that the symmetric key 600 and the asymmetric key 602 cannot be read or modified by a device (e.g., a print apparatus logic circuit) external to logic circuit 402. The certificate 604 may be stored in memory arrangement 406a in such a way that the certificate 604 can be read, but not modified, by a device external to logic circuit 402.

The symmetric key 600 may correspond to a symmetric key of a print apparatus logic circuit (e.g., 304 of FIG. 3) for initiating a secure communication session between the logic circuit 402 of a logic circuitry package 400 for a replaceable print apparatus component (e.g., 500 of FIG. 5) and the print apparatus logic circuit. Within secure communication sessions, using the symmetric key 600, symmetrically authenticated responses may be generated in response to symmetrically authenticated commands of the print apparatus logic circuit. In some examples, the symmetric key 600 may be a symmetric base key used to generate a session key for each secure communication session. In this case, the session key may be used to generate symmetrically authenticated responses in response to symmetrically authenticated commands of the print apparatus logic circuit.

The asymmetric key 602 may be a private key used to compute a static signature in response to a static signature request from the print apparatus logic circuit. The certificate 604 corresponding to the asymmetric (private) key 602 may include a public key signed by a certificate authority private key. The print apparatus logic circuit may store the certificate authority public key. Therefore, the print apparatus logic circuit may read the certificate 604, verify the authenticity of the certificate 604 using the certificate authority public key, and use the public key included in the certificate 604 corresponding to the asymmetric (private) key 602 to verify the static signature computed by the logic circuit of the replaceable print apparatus component. In one example, a plurality of certificates 604, each corresponding to a respective asymmetric key 602, is signed by the certificate authority under a single signature. The signature can be a digital signature. The certificates can be included, amongst other data of the certificate authority, in the digital signature. In one example, the certificate authority is the party who generated the data that is signed, such as an original equipment manufacturer or a party authorized and/or licensed by the original equipment manufacturer. In examples where the signature is stored on a third party memory arrangement, not authorized by the certificate authority, the signature as signed by the certificate authority will have been copied. Hence the signature is still considered to be signed by the certificate authority even where the signature was stored on the memory arrangement by unauthorized third parties. In any event, in this disclosure the more generalized term certificate signing private/public key may be used instead of certificate authority private/public key. Where the term certificate authority private/public key is used, this may be replaced by certificate signing private or public key, respectively, and vice versa, certificate signing private or public key may be replaced by the more specific certificate authority private or public key, respectively.

Figure 6B:
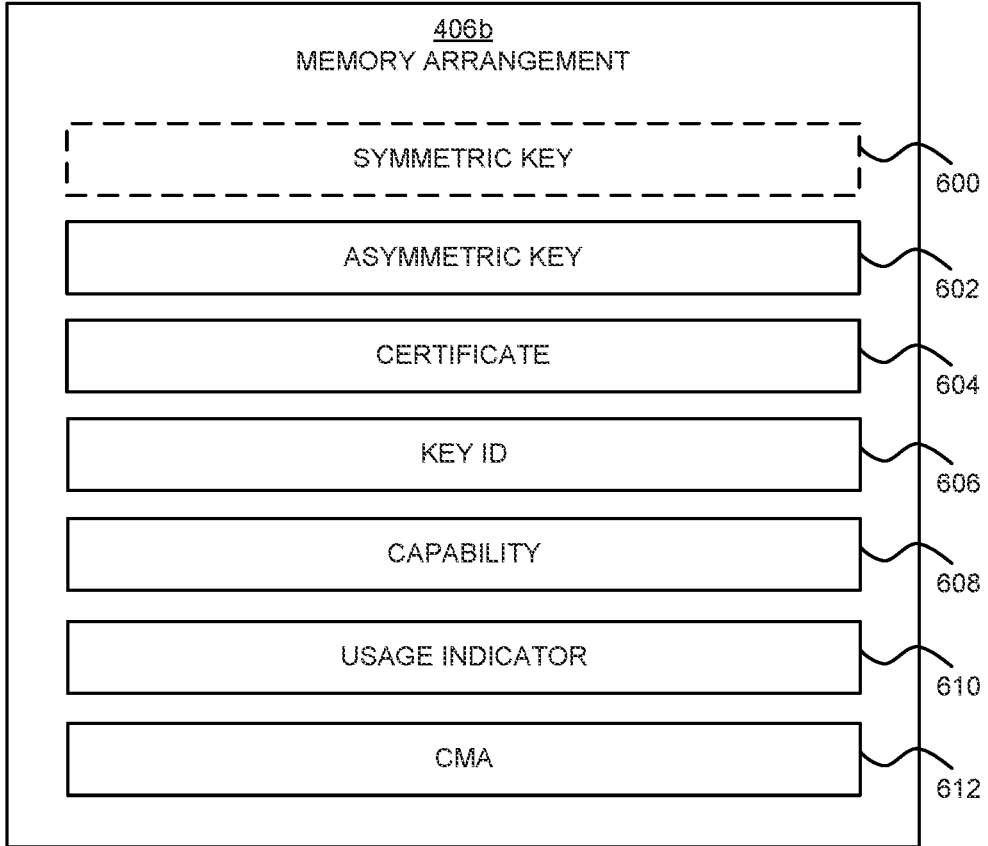

FIG. 6B illustrates another example of a memory arrangement 406b. In some examples, memory arrangement 406b may provide memory arrangement 406 of FIG. 4 or 5. The memory arrangement 406b stores an asymmetric key 602. In one example, the memory arrangement 406b stores a symmetric key 600. In another example, the memory arrangement 406b does not store a symmetric key. The memory arrangement 406b stores a certificate 604, a key ID 606, a capability 608, a usage indicator 610, and/or a CMA 612 each corresponding to the asymmetric key 602. The symmetric key 600, the asymmetric key 602, and the certificate 604 were previously described above with reference to FIG. 6A.

The key ID 606 identifies the asymmetric key 602. The capability 608 indicates the capability of asymmetric key 602. As previously described, the capability may indicate whether asymmetric key 602 includes a static signature capability and/or other signature capabilities. Also, as previously described, the usage indicator 610 indicates how many more times the asymmetric key 602 may be used to compute a static signature. The CMA 612 indicates the signing algorithm to be used when computing the signature. In one example, the CMA 612 indicates the Rivest, Shamir, Adleman Signature Scheme with Appendix-Probabilistic Signature Scheme (RSASSA-PSS) algorithm with Hash Function equal to Secure Hashing Algorithm-256 (SHA-256), Mask Generation Function (MGF) equal to MGF1, and Salt Length equal to 32 bytes. In other examples, the CMA 612 may indicate another suitable signing algorithm.

The symmetric key 600 and the asymmetric key 602 may be stored in a memory type and/or memory hardware of memory arrangement 406b that cannot be read by a print apparatus logic circuit. As such, the symmetric key 600 and the asymmetric key 602 may be internally accessible to logic circuit 402 for performing authentication functions but externally inaccessible (e.g., to a print apparatus logic circuit) for read or write operations.

The certificate 604, the key ID 606, the capability 608, the usage indicator 610, and the CMA 612 may be stored in memory arrangement 406b in such a way that the certificate 604, the key ID 606, the capability 608, the usage indicator 610, and the CMA 612 can be read, but not modified, by a device external to logic circuit 402. In some examples, the certificate 604, the key ID 606, the capability 608, the usage indicator 610, and the CMA 612 may be stored in a similar memory type and/or the same memory hardware of memory arrangement 406b that may be read by a print apparatus logic circuit. As such, the certificate 604, the key ID 606, the capability 608, the usage indicator 610, and the CMA 612 may be internally accessible to logic circuit 402 for read and/or write operations and externally accessible (e.g., to a print apparatus logic circuit) for read operations.

Figure 6C:
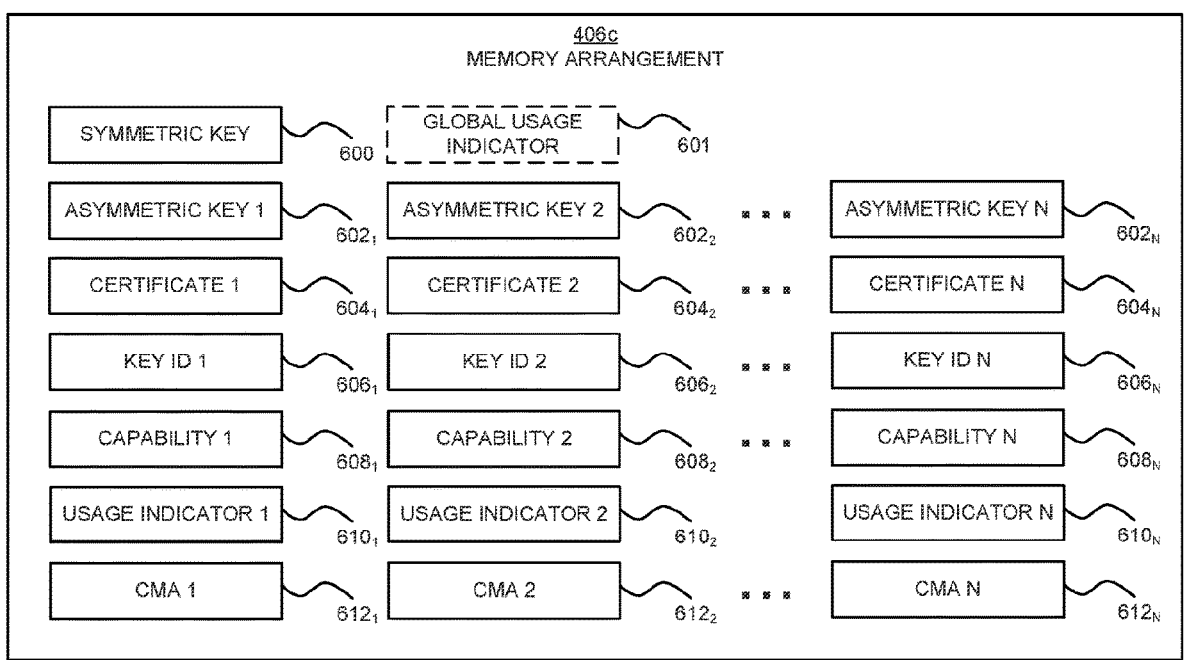

FIG. 6C illustrates another example of a memory arrangement 406c. In some examples, memory arrangement 406c may provide memory arrangement 406 of FIG. 4 or 5. In this example, memory arrangement 406c stores a symmetric key 600. In one example, memory arrangement 460c stores a global usage indicator 601. In other examples, memory arrangement 460c does not store a global usage indicator. The memory arrangement 406c stores a plurality of asymmetric keys 6021 to 602N, and a plurality of certificates 6041 to 604N, a plurality of key IDs 6061 to 606N, a plurality of capabilities 6081 to 608N, a plurality of usage indicators 6101 to 610N, and a plurality of CMAs 6121 to 612N each corresponding to the asymmetric key 6021 to 602N, respectively, where "N" is any suitable number of asymmetric keys, such as 2, 3, 4, 5, etc.

In some examples that include the global usage indicator 601, the global usage indicator 601 may indicate how many more times an asymmetric key 6021 to 602N may be used to compute a static signature. The global usage indicator 601 may be decremented or incremented each time any asymmetric key 6021 to 602N is used to compute a static signature. When the global usage indicator 601 equals a minimum value (e.g., 0 for a decrementing usage indicator) or a maximum value (e.g., 3, 4, 5, etc., for an incrementing usage indicator) none of the asymmetric keys 6021 to 602N may be used to compute a static signature and the static signature request may be rejected. In examples including the global usage indicator 601, the usage indicators 6101 to 610N may be decremented or incremented each time the corresponding asymmetric key 6021 to 602N is used to compute a signature other than a static signature. In other examples not including global usage indicator 601, the usage indicators 6101 to 610N corresponding to asymmetric keys 6021 to 602N may be decremented or incremented each time the asymmetric key is used to compute a static signature. When the usage indicator corresponding to an asymmetric key equals a minimum value (e.g., 0 for a decrementing usage indicator) or a maximum value (e.g., 3, 4, 5, etc., for an incrementing usage indicator) the asymmetric key may no longer be used to compute a static signature and the static signature request may be rejected.

A replaceable print apparatus component including a logic circuitry package 400 including memory arrangement 406c may not be authenticated (e.g., may be unusable) by a printing system unless the memory arrangement 406c stores an asymmetric key capable of being used to generate a signature validated by a print apparatus logic circuit of the printing system. Memory arrangement 406c may include multiple asymmetric keys. As will be described in more detail below, when logic circuitry package 400 is initially installed in a printing system and powered up, logic circuit 402 may receive a static signature request for a selected asymmetric key (as indicated by a key ID). If the computed signature is validated by the print apparatus logic circuit (e.g., via the corresponding certificate), the replaceable print apparatus component including logic circuitry package 400 may be used by the printing system. Thus, the next time the logic circuitry package 400 is powered up in the same printing system, the printing system may use the replaceable print apparatus component including logic circuitry package 400 without sending another static signature request to the logic circuitry package.

If the computed signature is not validated by the print apparatus logic circuit, the replaceable print apparatus component including logic circuitry package 400 may be denied access to certain functionalities and/or services of the printing system. Examples of functionalities that may be stopped or denied by the print apparatus logic circuit due to non-authentication could include printing consumable from the non-authenticated component. In contrast, the print apparatus may keep providing services and using consumable components associated with authenticated packages 400.

FIG. 7 illustrates one example of a consumable cartridge 700. Consumable cartridge 700 may provide the replaceable print apparatus component 104 of FIG. 1, the replaceable print apparatus component 200 of FIG. 2, or the print apparatus cartridge 500 of FIG. 5. Consumable cartridge 700 includes a reservoir 702 containing consumable material, a logic circuit interface 704 to communicate with a host print apparatus logic circuit, and a logic circuit 706. The consumable material may include ink, dry toner, liquid toner, or a 3D print agent. The reservoir 702 may be connected to an output (not shown) to dispense the consumable material from reservoir 702. Interface 704 may be an I2C interface or another suitable interface for communicating with a host print apparatus logic circuit.

Logic circuit 706 includes a processor 708, other authentication logic 710, and a memory arrangement 712. Memory arrangement 712 includes an attribute storage memory 714, a key storage memory 724, a general purpose user memory 730, and instructions 740, 742, and 744. In one example, memory arrangement 712 may include a single or multiple memory devices, and may include any or any combination of volatile memory (e.g., DRAM, SRAM, registers, etc.) and non-volatile memory (e.g., ROM, EEPROM, Flash, EPROM, memristor, etc.).

The attribute storage memory 714 may store key ID(s) 716, capability(s) 718, usage indicator(s) 720, and CMA(s) 722. In some examples, the attribute storage memory 714 is accessible for read and/or write access by processor 708 and/or other authentication logic 710. Attribute storage memory 714 is accessible only for read access by a print apparatus logic circuit by sending requests to processor 708, which may carry out the requested operations and return the requested data to the print apparatus logic circuit. The key storage memory 724 may store symmetric base key(s) 726 and asymmetric private key(s) 728. In some examples, the key storage memory 724 is accessible for read and write access by processor 708 and/or other authentication logic 710 and inaccessible to a print apparatus logic circuit. The general purpose user memory 730 may store certificate(s) 732. In some examples, the general purpose user memory 730 is accessible for read and/or write access by processor 708, other authentication logic 710, and/or a print apparatus logic circuit via processor 708. In some examples, certificate(s) 732 may be stored in a read-only portion of the general purpose user memory 730, such that the certificates are accessible only for read access by processor 708, other authentication logic 710, and/or a print apparatus logic circuit via processor 708. Each private key 728 corresponds to a key ID 716, a capability 718, a usage indicator 720, a CMA 722, and a certificate 732. A session key may be derived from the symmetric base key 726.

Instructions 740 are instructions for secure communication sessions between the logic circuit 706 and a print apparatus logic circuit based on the symmetric base key 726. Instructions 742 are instructions for signature computations in response to a static signature request from a print apparatus logic circuit. A signature is computed based on a selected private key 728 (as identified by a corresponding key ID from a print apparatus logic circuit) and challenge data from the print apparatus logic circuit in a static signature request. Instructions 744 are instructions for updating usage indicator(s) 720, such as in response to computing a static signature based on a private key 728 corresponding to the usage indicator 720.

Processor 708 executes instructions to control the operation of logic circuit 706 including the instructions 740, 742, and 744 and instructions for accessing memory arrangement 712 for read and/or write operations. Processor 708 may respond to external requests or commands from a print apparatus logic circuit (e.g., through interface 704) to return data (e.g., key ID(s) 716, capability(s) 718, usage indicator(s) 720, CMA(s) 722, certificate(s) 732, etc.), update data, and/or initiate a function (e.g., start a secure communication session, compute a signature, etc.). Processor 708 may also respond to internal requests or commands within logic circuit 706 to generate and/or update key ID(s) 716, capability(s) 718, usage indicator(s) 720, CMA(s) 722, or certificate(s) 732. The other authentication logic 710 may include high speed calculator logic to process predetermined iterative calculations and/or other logic to process authentication algorithms. In some examples, the other authentication logic 710 may execute the instructions for secure communication sessions 740 and/or instructions for signature computations 742 or a portion of the instructions for secure communication sessions 740 and/or instructions for signature computations 742.

FIGS. 8A-8J are flow diagrams illustrating example methods 800 that may be carried out by a logic circuit, such as the logic circuit 402 or 706 of FIG. 4, 5, or 7. The logic circuit may be part of a logic circuitry package (e.g., 400 of FIG. 4 or 5) for a replaceable print apparatus component (e.g., 500 of FIG. 5 or 700 of FIG. 7) including an interface (e.g., 404 of FIG. 4 or 5; or 704 of FIG. 7) to communicate with a print apparatus logic circuit (e.g., 304 of FIG. 3) as previously described. In this example, the logic circuit may be configured to include a symmetric key (e.g., 600 of FIG. 6A or 6B; or 726 of FIG. 7), an asymmetric key (e.g., 602 of FIG. 6A or 6B; or 728 of FIG. 7), and a certificate (e.g., 604 of FIG. 6A or 6B; or 732 of FIG. 7) corresponding to the asymmetric key. In some examples, the asymmetric key may include a private key. The certificate may include a public key corresponding to the asymmetric (private) key and may be signed with a certificate authority private key. The symmetric key, asymmetric key, and certificate corresponding to the asymmetric key may be stored in a memory arrangement (e.g., 406 of FIG. 4 or 5; or 712 of FIG. 7) and/or generated and/or updated by the logic circuit. For example, the asymmetric key may be stored in a key storage memory (e.g., 724 of FIG. 7) of the memory arrangement designed to not transmit the asymmetric key to a print apparatus logic circuit, and the certificate may be stored in a general purpose user memory (e.g., 730 of FIG. 7) of the memory arrangement to be transmitted in response to a read command. A plurality of certificates 604 may be signed by the certificate authority and stored as a single signature in the general purpose user memory.

As illustrated in FIG. 8A at 802, the logic circuit may be configured to in a secure communication session, using the symmetric key, generate symmetrically authenticated responses to symmetrically authenticated commands of the print apparatus logic circuit. At 804, the logic circuit may be configured to, within the secure communication session, transmit, to the print apparatus logic circuit, the certificate (e.g., in response to a request from the print apparatus logic circuit). At 806, the logic circuit may be configured to, within the secure communication session, receive, from the print apparatus logic circuit, a static signature request comprising challenge data. At 808, the logic circuit may be configured to, within the secure communication session, transmit, to the print apparatus logic circuit, a signature computed based on the challenge data and the asymmetric key in response to the static signature request. In one example, the logic circuit may be configured to compute the signature using RSASSA-PSS, with Hash Function equal to SHA-256, Mask Generation Function equal to MGF1, and Salt Length equal to 32 bytes.

Figure 8C:
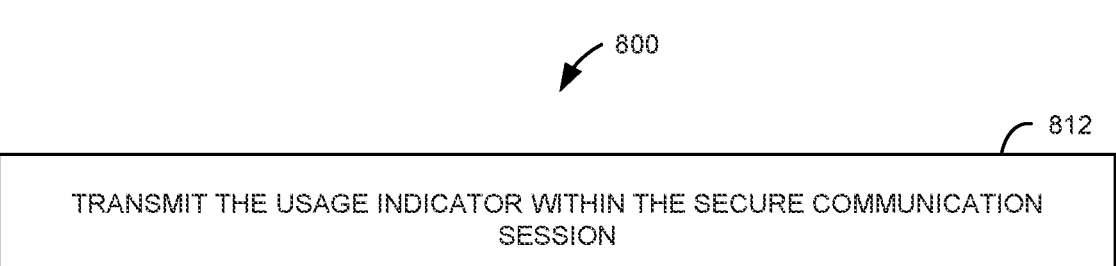

In some examples, the memory arrangement may store a usage indicator (e.g., 610 of FIG. 6B, 601 of FIG. 6C, or 720 of FIG. 7) corresponding to the asymmetric key. In these examples, as illustrated in FIG. 8B at 810, the logic circuit may be further configured to increment or decrement the usage indicator in response to computing the signature. As illustrated in FIG. 8C at 812, the logic circuit may be further configured to transmit the usage indicator within the secure communication session. In other examples, the usage indicator may remain constant and not be incremented or decremented in response to computing the signature.

Figure 8D:
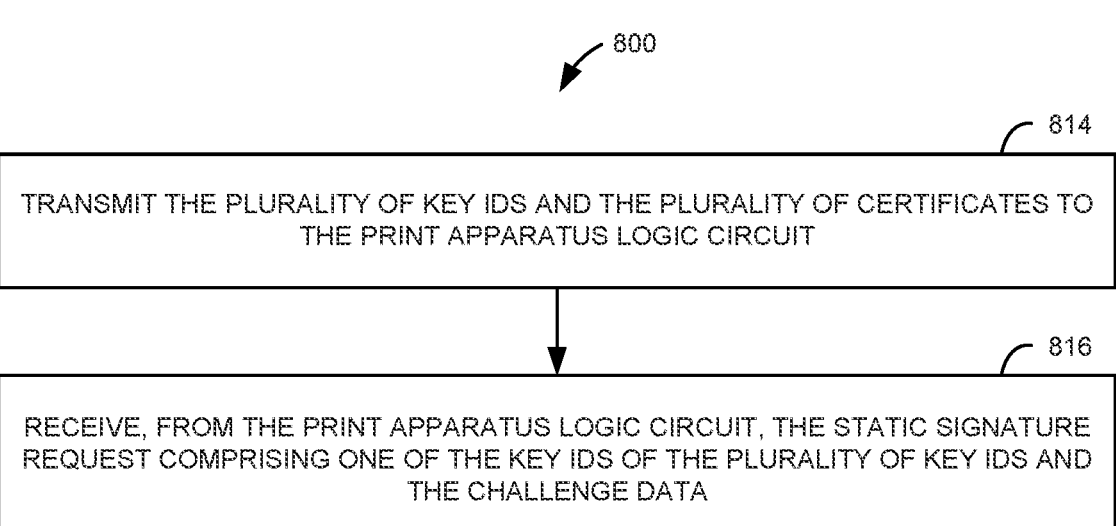

In some examples, the memory arrangement may store a plurality of asymmetric keys (e.g., 6021 to 602N of FIG. 6C or 728 of FIG. 7), a plurality of corresponding key IDs (e.g., 6061 to 606N of FIG. 6C or 716 of FIG. 7), and a plurality of corresponding certificates (e.g., 6041 to 604N of FIG. 6C or 732 of FIG. 7). In these examples, as illustrated in FIG. 8D at 814, the logic circuit may be further configured to transmit the plurality of key IDs and the plurality of certificates to the print apparatus logic circuit. At 816, the logic circuit may be further configured to receive, from the print apparatus logic circuit, the static signature request comprising one of the key IDs of the plurality of key IDs and the challenge data.

Figure 8E:
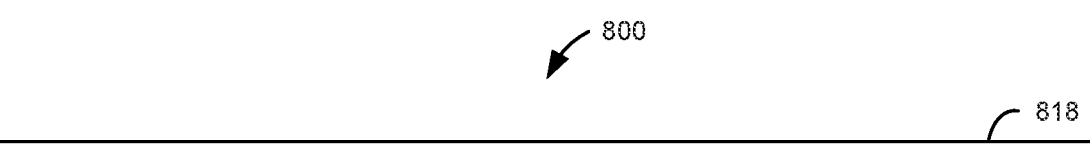

In other examples, the memory arrangement may store a plurality of usage indicators (e.g., 6101 to 610N of FIG. 6C or 720 of FIG. 7) corresponding to the plurality of asymmetric keys. In these examples, as illustrated in FIG. 8E at 818, the logic circuit may be further configured to increment or decrement the usage indicator corresponding to a respective asymmetric key of the plurality of asymmetric keys in response to computing the signature based on the respective asymmetric key. In other examples, the usage indicator corresponding to a respective asymmetric key may remain constant and not be incremented or decremented in response to computing the signature based on the respective asymmetric key.

In some examples, the usage indicator corresponding to the respective asymmetric key is a remaining usage indicator to be decremented. In these examples, as illustrated in FIG. 8F at 820, the logic circuit may be further configured to verify that the remaining usage indicator is greater than zero. At 822, the logic circuit may be further configured to, if the remaining usage indicator is greater than zero, compute and transmit the signature, and decrement the remaining usage indicator. At 824, the logic circuit may be further configured to, if the remaining usage indicator is not greater than zero, not compute or transmit the signature. In other examples, the logic circuit may be configured to compute and transmit the signature even if the remaining usage indicator is not greater than zero.

As illustrated in FIG. 8G at 826, the logic circuit may be further configured to, in response to at least one request, transmit the plurality of certificates, the plurality of key IDs, and/or the plurality of usage indicators within the secure communication session. As illustrated in FIG. 8H at 828, the logic circuit may be further configured to, for each secure communication session, generate a session key based on the symmetric key, the session key used to generate the symmetrically authenticated responses to the symmetrically authenticated commands, the symmetric key being a base key and the session key being newly generated for each secure communication session.

In some examples, the memory arrangement may store at least one capability (e.g., 6081 to 608N of FIG. 6C or 718 of FIG. 7) corresponding to each asymmetric key. In these examples, as illustrated in FIG. 8I at 830, the logic circuit may be further configured to, within the secure session, transmit, to the print apparatus logic circuit, the at least one capability.

As illustrated in FIG. 8J at 832, the logic circuit may be further configured to, within the secure session, transmit, to the print apparatus logic circuit, an error message in response to the static signature request in response to the usage indicator equaling zero and/or the corresponding capability not indicating a static signature generation capability. In other examples, the logic circuit may be configured to compute and transmit a signature in response to the static signature request even if the usage indicator equals zero and/or the corresponding capability does not indicate a static signature generation capability.

FIGS. 9A-9E are flow diagrams illustrating other example methods that may be carried out by a logic circuit, such as the logic circuit 402 or 706 of FIG. 4, 5, or 7. The logic circuit may be part of a replaceable print cartridge (e.g., 500 of FIG. 5 or 700 of FIG. 7) including a print consumable (e.g., within reservoir 502 of FIG. 5 or reservoir 702 of FIG. 7) and an interface (e.g., 404 of FIG. 4 or 5; or 704 of FIG. 7) to communicate with a print apparatus logic circuit (e.g., 304 of FIG. 3) as previously described. The logic circuit may include a memory arrangement (e.g., 406 of FIG. 4 or 5; or 712 of FIG. 7) storing a plurality of private keys (e.g., 6021 to 602N of FIG. 6C or 728 of FIG. 7), a plurality of key IDs (e.g., 6061 to 606N of FIG. 6C or 716 of FIG. 7), and a plurality of certificates (e.g., 6041 to 604N of FIG. 6C or 732 of FIG. 7) comprising respective public keys. Each key ID and each certificate may correspond to a respective private key. Each certificate may include a respective public key corresponding to a respective private key and may be signed using a certificate authority private key. In one example, a plurality of the certificates is signed together using the certificate authority private key.

As illustrated in FIG. 9A at 902, the logic circuit may be configured to, in response to at least one request, transmit the plurality of key IDs and the plurality of certificates to the print apparatus logic circuit. At 904, the logic circuit may be configured to receive a static signature request comprising a key ID to select the corresponding private key of the plurality of private keys, and challenge data. At 906, the logic circuit may be configured to transmit a static signature computed based on the challenge data and the selected private key in response to the static signature request.

In some examples, the memory arrangement may further store a symmetric base key (e.g., 600 of FIG. 6C or 726 of FIG. 7) corresponding to a master key of the print apparatus logic circuit. In these examples, as illustrated in FIG. 9B at 908, the logic circuit may be further configured to, based upon the symmetric base key (e.g., by deriving a session key from the symmetric base key), generate symmetrically authenticated responses, including the key IDs, certificates, and static signature, in response to symmetrically authenticated commands of the print apparatus logic circuit.

In some examples, the memory arrangement may store a plurality of remaining usage indicators (e.g., 6101 to 610N of FIG. 6C or 720 of FIG. 7). Each remaining usage indicator may correspond to a respective private key. In these examples, as illustrated in FIG. 9C at 910, the logic circuit may be further configured to, in response to at least one request, transmit the plurality of remaining usage indicators. At 912, the logic circuit may be further configured to verify that the remaining usage indicator corresponding to the selected private key is greater than zero. At 914, the logic circuit may be further configured to, if the remaining usage indicator corresponding to the selected private key is greater than zero, compute and transmit the static signature, and decrement the remaining usage indicator. At 916, the logic circuit may be further configured to, if the remaining usage indicator corresponding to the selected private key is not greater than zero, not compute or transmit the static signature.

In some examples, the memory arrangement may store a plurality of capabilities (e.g., 6081 to 608N of FIG. 6C or 718 of FIG. 7). Each capability may correspond to a respective private key. In these examples, as illustrated in FIG. 9D at 918, the logic circuit may be further configured to, in response to at least one request, transmit the plurality of capabilities. At 920, the logic circuit may be further configured to verify that the capability corresponding to the selected private key indicates a static signature generation capability. At 922, the logic circuit may be further configured to, if the capability corresponding to the selected private key indicates a static signature generation capability, compute and transmit the signature. At 924, the logic circuit may be further configured to, if the capability corresponding to the selected private key does not indicate a static signature generation capability, not compute or transmit the signature.

As illustrated in FIG. 9E at 926, the logic circuit may be further configured to, based upon the symmetric base key (e.g., by deriving a session key from the symmetric base key), generate symmetrically authenticated responses, including the plurality of usage indicators and/or the plurality of capabilities, in response to symmetrically authenticated commands of the print apparatus logic circuit.

Figure 10A:
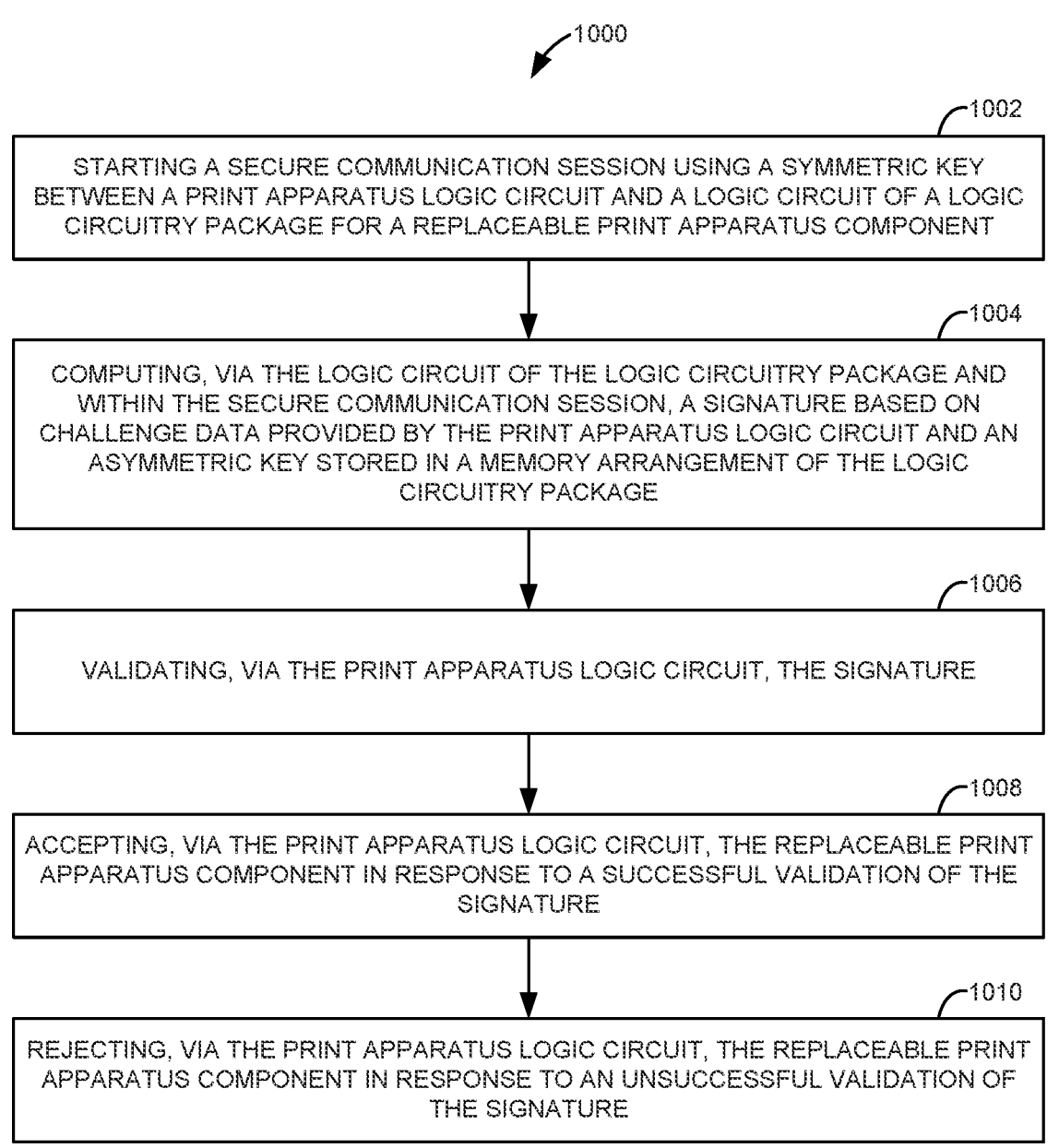

FIGS. 10A-10C are flow diagrams illustrating example methods 1000 for operating a printing system, such as printing system 100 of FIG. 1. As illustrated in FIG. 10A at 1002, method 1000 may include starting a secure communication session using a symmetric key (e.g., 600 of FIGS. 6A-6C or 726 of FIG. 7) between a print apparatus logic circuit (e.g., 304 of FIG. 3) and a logic circuit (e.g., 402 of FIG. 4 or 5; or 706 of FIG. 7) of a logic circuitry package (e.g., 400 of FIG. 4 or 5) for a replaceable print apparatus component (e.g., 500 of FIG. 5 or 700 of FIG. 7). At 1004, method 1000 may include computing, via the logic circuit of the logic circuitry package and within the secure communication session, a signature based on challenge data provided by the print apparatus logic circuit and an asymmetric key (e.g., 602 of FIGS. 6A-6C or 728 of FIG. 7) stored in a memory arrangement (e.g., 406 of FIG. 4 or 5; or 712 of FIG. 7) of the logic circuitry package. At 1006, method 1000 may include validating, via the print apparatus logic circuit, the signature. At 1008, method 1000 may include accepting, via the print apparatus logic circuit, the replaceable print apparatus component in response to a successful validation of the signature. At 1010, method 1000 may include rejecting, via the print apparatus logic circuit, the replaceable print apparatus component in response to an unsuccessful validation of the signature.

As illustrated in FIG. 10B at 1012, method 1000 may further include transmitting, from the logic circuit of the logic circuitry package to the print apparatus logic circuit, a plurality of key IDs (e.g., 6061 to 606N of FIG. 6C or 716 of FIG. 7) and a plurality of capabilities (e.g., 6081 to 608N of FIG. 6C or 718 of FIG. 7), each key ID of the plurality of key IDs and each capability of the plurality of capabilities corresponding to an asymmetric key of a plurality of asymmetric keys (e.g., 6021 to 602N of FIG. 6C or 728 of FIG. 7) stored in the memory arrangement of the logic circuitry package. At 1014, method 1000 may further include receiving, at the logic circuit of the logic circuitry package from the print apparatus logic circuit, a static signature request comprising a selected key ID of the plurality of key IDs and the challenge data, wherein computing the signature comprises computing the signature based on the challenge data and an asymmetric key of the plurality of asymmetric keys corresponding to the selected key ID.

As illustrated in FIG. 10C at 1016, method 1000 may further include transmitting, from the logic circuit of the logic circuitry package to the print apparatus logic circuit, a plurality of usage indicators (e.g., 6101 to 610N of FIG. 6C or 720 of FIG. 7), each usage indicator of the plurality of usage indicators corresponding to a key ID of the plurality of key IDs. At 1018, method 1000 may further include decrementing or incrementing the usage indicator of the plurality of usage indicators corresponding to the selected key ID in response to computing the signature.

Figure 11A:
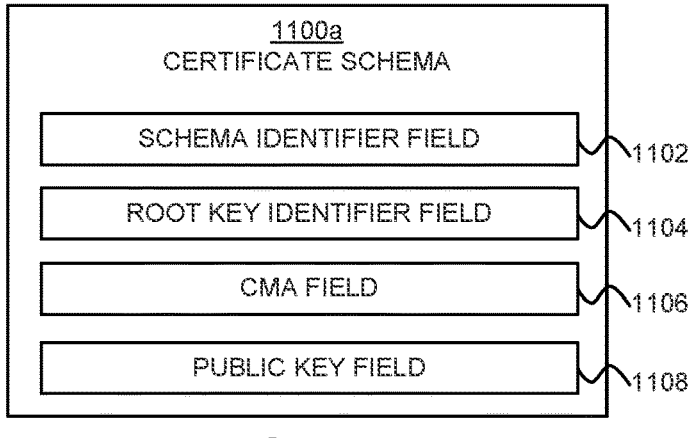
FIGS. 11A-11C illustrate example certificate schemas for public key certificates.

FIG. 11A illustrates one example of a certificate schema 1100a for a public key certificate, such as certificate 604 of FIGS. 6A and 6B, certificate 6041 to 604N of FIG. 6C, or certificate(s) 732 of FIG. 7. Certificate schema 1100a may define an RSA public key certificate or an Elliptic-Curve Cryptography (ECC) public key certificate. Certificate schema 1100a includes a schema identifier field 1102, a root key identifier field 1104, a Cryptographic Mode of Use Attribute (CMA) field 1106, and a public key field 1108.

The schema identifier field 1102 may have a length of 1 byte and may include a schema version number within a range between 1 and 255. The root key identifier field 1104 may have a length of 2 bytes and may include an identifier for a device-specific key (e.g., an RSA key or an ECC key). The CMA field 1106 may have a length of 1 byte and may indicate a signing algorithm to be used when computing a signature. The public key field 1108 may have a length of 259 bytes (e.g., for an RSA public key) or 32 bytes (e.g., for an ECC public key).

Figure 11B:
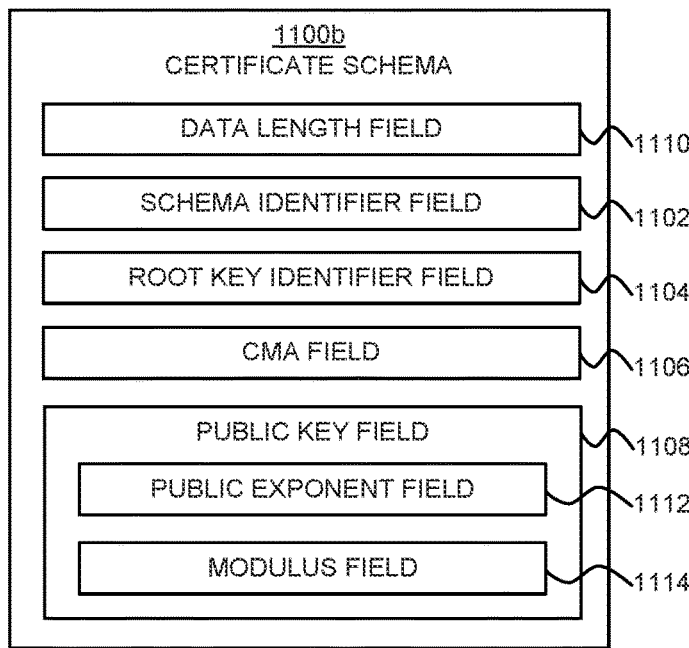

FIG. 11B illustrates one example of a certificate schema 1100b for a public key certificate, such as certificate 604 of FIGS. 6A and 6B, certificate 6041 to 604N of FIG. 6C, or certificate(s) 732 of FIG. 7. Certificate schema 1100b may define an RSA public key certificate. Certificate schema 1100b includes a data length field 1110, a schema identifier field 1102, a root key identifier field 1104, a CMA field 1106, and a public key field 1108. The public key field 1108 includes a public exponent field 1112 and a modulus field 1114.

The data length field 1110 may have a length of 2 bytes and may indicate the total accumulated length (e.g., in bytes) of the fields 1102, 1104, 1106, 1112, and 1114 of the certificate schema. The schema identifier field 1102 may have a length of 1 byte and may include a schema version number within a range between 1 and 255. In this example, the root key identifier field 1104 may include an identifier for a device-specific RSA key. The CMA field 1106 may have a length of 1 byte and may indicate a signing algorithm to be used when computing a signature. The CMA field 1106 may indicate an algorithm (e.g., RSASSA-PSS) with a Hash Function (e.g., SHA-256), a Mask Generation Function (e.g., MGF1), and a Salt Length (e.g., 32 bytes). The public exponent field 1112 may have a length of 3 bytes and include a public exponent. The modulus field 1114 may have a length of 256 bytes and includes a 2048 bit modulus (e.g., the product of two prime numbers used to generate the key pair). Accordingly, the RSA public key certificate indicated by certificate schema 1100b may include 265 bytes and the data length field 1110 may indicate a length of 263 bytes.

Figure 11C:
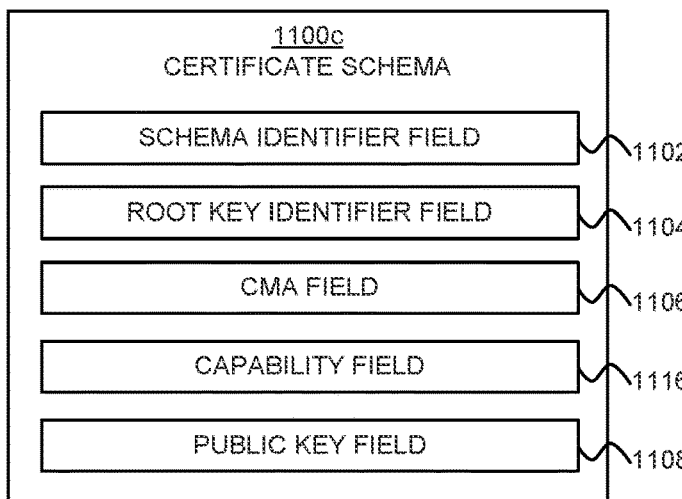

FIG. 11C illustrates one example of a certificate schema 1100c for a public key certificate, such as certificate 604 of FIGS. 6A and 6B, certificate 6041 to 604N of FIG. 6C, or certificate(s) 732 of FIG. 7. Certificate schema 1100c may define an ECC public key certificate. Certificate schema 1100c includes a schema identifier field 1102, a root key identifier field 1104, a CMA field 1106, a capability field 1116, and a public key field 1108.

The schema identifier field 1102 may have a length of 1 byte and may include a schema version number within a range between 1 and 255. In this example, the root key identifier field 1104 may include an identifier for a device-specific ECC key. The CMA field 1106 may have a length of 1 byte and may indicate a signing algorithm to be used when computing a signature. The capability field 1116 may have a length of 1 byte and may indicate supported signing functions (e.g., static signature, manufacturing signature, etc.). In this example, the public key field 1108 may have a length of 32 bytes and include a 256 bit public key value. Accordingly, the ECC public key certificate indicated by certificate schema 1100c may include 37 bytes.

In certain examples, compared to X.509 certificates, which typically include about 900 bytes for RSA keys and about 400 bytes for ECC keys, the certificate schema 1100b for RSA public keys uses 265 bytes and the certificate schema 1100c for ECC public keys uses 37 bytes, thereby reducing the memory footprint. In some examples, these data sizes can be further reduced. In other examples, these data sizes may be slightly increased. For example, at least one additional field may be added (e.g., including 1 or 2 bytes) to provide 38 or 39 bytes for the ECC schema and/or 266 or 267 bytes for the RSA schema.

Public keys using X.509 certificates require a separate certificate to be validated per public key. In contrast, the certificate schemas 1100a, 1100b, and 1100c may allow validation of a single signature for multiple public keys, thereby reducing execution time. Unlike for X.509 certificates, certificate schemas 1100a, 1100b, and 1100c do not require external libraries for parsing and validating the certificates. In certain examples, certificate schemas 1100a, 1100b, and 1100c are easier to document (e.g., in a single page) and faster to implement than X.509 certificates. Certificate schemas 1100a, 1100b, and 1100c may be easier to test and validate than X.509 certificates since there are fewer variables, which equates to less testing. In addition, certificate schemas 1100a, 1100b, and 1100c include the ability to incorporate application-specific features, such as the root key identifier field 1104 and the CMA field 1106.

Each of the logic circuits 402 and 706 described herein may have any feature of the other logic circuit 402 and 706 described herein. Any logic circuit 402 or 706 may be configured to carry out at least one method block of the methods described herein.

Examples in the present disclosure can be provided as methods, systems or machine readable instructions, such as any combination of software, hardware, firmware or the like. Such machine readable instructions may be included on a machine readable storage medium (including but not limited to EEPROM, PROM, flash memory, disc storage, CD-ROM, optical storage, etc.) having machine readable program codes therein or thereon.

The present disclosure is described with reference to flow charts and block diagrams of the method, devices, and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus, functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array, etc. The methods and functional modules may all be performed by a single processor or divided amongst several processors.

Such machine readable instructions may also be stored in a machine readable storage (e.g., a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, and "a" or "an" does not exclude a plurality.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

Aspects of this disclosure concern a logic circuitry package and/or a logic circuit of the package. The package comprises an interface to communicate with a host logic circuit, and the logic circuit. The logic circuit includes or is connected to the interface. The logic circuitry package can be of a print apparatus component such as a cartridge or a part of any other component. The example of the cartridge may comprise a reservoir with print consumable. The host logic circuit can be of a print apparatus and may be referred to as print apparatus logic circuit. The logic circuit comprises a memory arrangement storing a symmetric key, and/or an asymmetric key, and/or a certificate corresponding to the asymmetric key. The logic circuit may be configured to: in a secure communication session, using the symmetric key, generate symmetrically authenticated responses to symmetrically authenticated commands of the host logic circuit. The logic circuit is configured to, for example within a secure communication session, transmit, to the host logic circuit, the certificate; receive, from the host logic circuit, a static signature request comprising challenge data; and transmit, to the host logic circuit, a signature computed based on the challenge data and the asymmetric key in response to the static signature request. In other aspects of this disclosure, a memory arrangement stores a plurality of private keys, a plurality of key IDs, and/or a plurality of certificates comprising respective public keys; each key ID of the plurality of key IDs and each certificate of the plurality of certificates corresponding to a respective private key of the plurality of private keys. The logic circuit is configured to: in response to at least one request, transmit the plurality of key IDs and the plurality of certificates to the print apparatus logic circuit; receive a static signature request comprising a key ID to select the corresponding private key of the plurality of private keys, and challenge data; and transmit a static signature computed based on the challenge data and the selected private key in response to the static signature request. The following different examples of the aforementioned aspects are disclosed, which examples may be applied individually or in any combination. The memory arrangement may store a usage indicator, and the logic circuit is configured to increment or decrement the usage indicator in response to computing the signature. The logic circuit may be configured to transmit the usage indicator within the secure communication session. The memory arrangement may store a plurality of asymmetric keys, a plurality of corresponding key IDs, and/or a plurality of corresponding certificates. The logic circuit may be configured to: transmit the plurality of key IDs and the plurality of certificates to the host logic circuit; and receive, from the host logic circuit, the static signature request comprising one of the key IDs of the plurality of key IDs and the challenge data. The memory arrangement may store a plurality of usage indicators corresponding to the plurality of asymmetric keys, and the logic circuit may be configured to increment or decrement the usage indicator corresponding to a respective asymmetric key of the plurality of asymmetric keys in response to computing the signature based on the respective asymmetric key. The usage indicator corresponding to the respective asymmetric key may be a remaining usage indicator to be decremented. The logic circuit may be configured to: verify that the remaining usage indicator is greater than zero; and if the remaining usage indicator is greater than zero, compute and transmit the signature, and decrement the remaining usage indicator, or if the remaining usage indicator is not greater than zero, not compute or transmit the signature. The, each and/or all certificate(s) may be signed with a certificate signing private key, for example, together under a single digital signature. The certificate signing private key can be a certificate authority private key. The logic circuit may be configured to, in response to at least one request, transmit the plurality of certificates, the plurality of key IDs, and/or the plurality of usage indicators within the secure communication session. The logic circuit may be configured to, for each secure communication session, generate a session key based on the symmetric key, the session key used to generate the symmetrically authenticated responses to the symmetrically authenticated commands, the symmetric key being a base key and the session key being newly generated for each secure communication session. The memory arrangement may store at least one capability corresponding to the or each asymmetric key. The logic circuit may be configured to, for example within the secure session, transmit, to the host logic circuit, the at least one capability. The logic circuit may be configured to, for example within the secure session, transmit, to the host logic circuit, an error message in response to the static signature request in response to the usage indicator equaling zero and/or the corresponding capability not indicating a static signature generation capability. The or each asymmetric key may comprise a private key. The or each private key may be stored in a key storage memory of the memory arrangement, the key storage memory designed (e.g., arranged, and/or configured, and/or partitioned, and/or have an access mode so as) to not transmit the or each private key to a host logic circuit. The or each certificate may comprise a public key corresponding to the or each private key. The or each certificate may be stored in a general purpose user memory of the memory arrangement to be transmitted in response to a read command. The logic circuit may be configured to compute the signature using RSASSA-PSS. The memory arrangement may store a symmetric base key corresponding to a master key of the print apparatus logic circuit, and the logic circuit may be configured to, based upon the symmetric base key, generate symmetrically authenticated responses, the responses including the key IDs, certificates, and static signature, in response to symmetrically authenticated commands of the print apparatus logic circuit. The memory arrangement may store a plurality of remaining usage indicators, each remaining usage indicator of the plurality of remaining usage indicators corresponding to a respective private key of the plurality of private keys. The logic circuit may be configured to: in response to at least one request, transmit the plurality of remaining usage indicators; and/or verify that the remaining usage indicator corresponding to the selected private key is greater than zero, and/or, if the remaining usage indicator corresponding to the selected private key is greater than zero, compute and transmit the static signature, and decrement the remaining usage indicator; and/or, if the remaining usage indicator corresponding to the selected private key is not greater than zero, not compute or transmit the static signature. The memory arrangement may store a plurality of capabilities, each capability of the plurality of capabilities corresponding to a respective private key of the plurality of private keys. The logic circuit may be configured to: in response to at least one request, transmit the plurality of capabilities; and/or, verify that the capability corresponding to the selected private key indicates a static signature generation capability, and/or, if the capability corresponding to the selected private key indicates a static signature generation capability, compute and transmit the signature, and/or, if the capability corresponding to the selected private key does not indicate a static signature generation capability, not compute or transmit the signature. The logic circuit may be configured to, based upon the symmetric base key, generate symmetrically authenticated responses, including the plurality of usage indicators and/or the plurality of capabilities, in response to symmetrically authenticated commands of the print apparatus logic circuit. Each certificate of the plurality of certificates may comprise a respective public key corresponding to a respective private key of the plurality of private keys and the plurality of certificates may be signed using a certificate signing private key, for example the plurality of certificates is signed together using a single certificate signing private key.

The following aspects and examples may be combined with any of the aforementioned aspects and examples. In another aspect, a certificate schema for a public key certificate is provided. The schema comprising: a schema identifier field; a root key identifier field; a Cryptographic Mode of Use Attribute (CMA) field; and/or, a public key field. Examples are as follows of any of the aforementioned aspects and examples may be as follows. The schema identifier field may store a schema version number. The root key identifier field may store an identifier of a device-specific key. The CMA field may store data indicating a signing algorithm to be used for computing a signature. The public key field may store an RSA public key or an ECC public key. The certificate schema may comprise a data length field. The public key field may comprise a public exponent field and a modulus field. The data length field may store data indicating a total accumulated length of the schema identifier field, the root key identifier field, the CMA field, the public exponent field, and/or the modulus field. The public exponent field may store an exponent used for signature verification. The modulus field may store a product of two prime numbers used to generate a key pair. The certificate schema may comprise a capability field. The capability field may store a capability indicating at least one supported signing function.

The certificate schema may define an RSA public key certificate. A data size of the RSA public key certificate can be 265 bytes or less. The certificate schema may define an ECC public key certificate. A data size of the ECC public key certificate may be 37 bytes or less. In yet another aspect, a certificate schema for an RSA public key certificate may comprise: a data length field; a schema identifier field; a root key identifier field; a Cryptographic Mode of Use Attribute (CMA) field; a public exponent field; and/or a modulus field. Examples of this aspect, or any of the aforementioned aspects, may be as follows. The capability field may store data indicating supported signing functions. The CMA field may store data indicating a signing algorithm to be used when computing a signature. The root key identifier field may store an identifier for a device-specific RSA key. The data length field may store data indicating a total accumulated length of the schema identifier field, root key identifier field, CMA field, public exponent field, and/or modulus field. The schema identifier field may store a schema version number. The public exponent field may store an exponent used for signature verification. The modulus field may store a product of two prime numbers used to generate a key pair. In again another aspect, a certificate schema for an ECC public key certificate comprises: a schema identifier field; a root key identifier field; a Cryptographic Mode of Use Attribute (CMA) field; a capability field; and/or a public key field. Examples of this aspect, or any of the aforementioned aspects, may be as follows. The capability field may store data indicating supported signing functions. The CMA field may store data indicating a signing algorithm to be used when computing a signature. The root key identifier field may store an identifier for a device-specific ECC key. The schema identifier field may store a schema version number. The public key field stores an ECC public key. In a further aspect, there is provided a memory arrangement of any of the aspects and/or examples comprising a certificate, wherein the certificate is defined according to the certificate schema of any of said aspects and/or examples. In a further aspect, a logic circuit of any of the previous aspects and examples comprises a processor and the memory arrangement. The memory arrangement may store at least one asymmetric private key in a key storage memory partition and at least one certificate in a user accessible partition, the or each certificate corresponding to the or each respective private key, wherein the at least one certificate is configured according to the certificate schema. The memory arrangement may comprise a plurality of certificates and corresponding private keys wherein each certificate of the plurality of certificates comprises a respective public key corresponding to a respective private key of the plurality of private keys and the plurality of certificates is signed using a certificate signing private key (e.g., a certificate authority private key). The certificate may be configured for a host logic circuit to read the certificate, verify the authenticity of the certificate(s) using the certificate signing public key (e.g., a certificate authority public key), and use the public key included in the certificate corresponding to the asymmetric private key to verify a static signature computed by the replaceable print apparatus logic circuit. In yet another aspect, a memory arrangement is provided storing a private key and a certificate corresponding to the private key, the certificate comprising a schema identifier field storing a schema version number, a root key identifier field storing an identifier corresponding to the private key, a Cryptographic Mode of Use Attribute (CMA) field storing data indicating a signing algorithm to be used when computing a signature using the private key, and/or a public key field storing a public key corresponding to the private key. The logic circuit may be configured to: compute a signature based on the private key; transmit, to the host logic circuit, the signature; and/or, transmit, to the host logic circuit, the certificate for the print apparatus logic circuit to verify the signature. The public key may comprise an RSA public key or an ECC public key. The certificate may comprise a data length field storing a total accumulated length of the schema identifier field, the root key identifier field, the CMA field, and/or the public key field. The public key may comprise a public exponent and a modulus. The certificate may comprise a capability field storing data indicating at least one supported signing function of the private key. The certificate may be an RSA public key certificate or an ECC public key certificate.

The invention claimed is:

1. A logic circuitry package comprising an interface to communicate with a host logic circuit, and a logic circuit comprising:

a memory arrangement storing a symmetric key, a plurality of asymmetric keys, a plurality of corresponding key IDs, and a plurality of corresponding certificates, each certificate of the plurality of corresponding certificates corresponding to a respective asymmetric key of the plurality of asymmetric keys;

wherein the logic circuit is configured to:

generate a session key based on the stored symmetric key to establish a secure communication session and using the session key, generate symmetrically authenticated responses to symmetrically authenticated commands of the host logic circuit; and within the secure communication session:

transmit, to the host logic circuit, the plurality of key IDs and the plurality of certificates;

receive, from the host logic circuit, a static signature request comprising one of the key IDs of the plurality of key IDs and challenge data; and transmit, to the host logic circuit, a signature computed based on the challenge data and a selected asymmetric key of the plurality of asymmetric keys corresponding to the one of the key IDs in response to the static signature request.

2. The logic circuitry package of claim 1, wherein the memory arrangement stores a usage indicator, and wherein the logic circuit is configured to increment or decrement the usage indicator in response to computing the signature.

3. The logic circuitry package of claim 2, wherein the logic circuit is configured to transmit the usage indicator within the secure communication session.

4. The logic circuitry package of claim 1, wherein the memory arrangement stores a plurality of usage indicators corresponding to the plurality of asymmetric keys, and wherein the logic circuit is configured to increment or decrement the usage indicator corresponding to a respective asymmetric key of the plurality of asymmetric keys in response to computing the signature based on the respective asymmetric key.

5. The logic circuitry package of claim 4, wherein the usage indicator corresponding to the respective asymmetric key is a remaining usage indicator to be decremented, and wherein the logic circuit is configured to:

verify that the remaining usage indicator is greater than zero; and if the remaining usage indicator is greater than zero, compute and transmit the signature, and decrement the remaining usage indicator, or if the remaining usage indicator is not greater than zero, not compute or transmit the signature.

6. The logic circuitry package of claim 1, wherein the or each certificate, or the plurality of certificates is signed with a certificate signing private key.

7. The logic circuitry package of claim 1, wherein the logic circuit is configured to, in response to at least one request, transmit the plurality of certificates, the plurality of key IDs, and/or the plurality of usage indicators within the secure communication session.

8. The logic circuitry package of claim 1, wherein the logic circuit is configured to, for each secure communication session, generate a session key based on the symmetric key, the session key used to generate the symmetrically authenticated responses to the symmetrically authenticated commands, the symmetric key being a base key and the session key being newly generated for each secure communication session.

9. The logic circuitry package of claim 1, wherein the memory arrangement stores at least one capability corresponding to the or each asymmetric key, and wherein the logic circuit is further configured to within the secure session:

transmit, to the host logic circuit, the at least one capability.

10. The logic circuitry package of claim 2, wherein the logic circuit is further configured to within the secure session:

transmit, to the host logic circuit, an error message in response to the static signature request in response to the usage indicator equaling zero and/or the corresponding capability not indicating a static signature generation capability.

11. The logic circuitry package of claim 1, wherein the asymmetric key comprises a private key.

12. The logic circuitry package of claim 11, wherein the private key is stored in a key storage memory of the memory arrangement, the key storage memory designed to not transmit the or each private key to a host logic circuit.

13. The logic circuitry package of claim 11, wherein the certificate comprises a public key corresponding to the or each private key.

14. The logic circuitry package of claim 13, wherein the certificate is stored in a general purpose user memory of the memory arrangement to be transmitted in response to a read command.

15. The logic circuitry package of claim 1, wherein the logic circuit is configured to compute the signature using RSASSA-PSS.

16. A replaceable print cartridge comprising a print consumable;

an interface to communicate with a print apparatus logic circuit; and a logic circuit comprising:

a memory arrangement storing a symmetric key, a plurality of private keys, a plurality of key IDs, and a plurality of certificates comprising respective public keys;

each key ID of the plurality of key IDs and each certificate of the plurality of certificates corresponding to a respective private key of the plurality of private keys;

wherein the logic circuit is configured to:

generate a session key based on the stored symmetric key to establish a secure communication session;

within the secure communication session, in response to at least one request, transmit the plurality of key IDs and the plurality of certificates to the print apparatus logic circuit;

within the secure communication session, receive a static signature request comprising a key ID to select the corresponding private key of the plurality of private keys, and challenge data; and within the secure communication session, transmit a static signature computed based on the challenge data and the selected private key in response to the static signature request.

17. The replaceable print cartridge of claim 16, wherein the symmetric key stored in the memory arrangement corresponds to a master key of the print apparatus logic circuit, and wherein the logic circuit is configured to, based upon the symmetric key, generate symmetrically authenticated responses, including the key IDs, certificates, and static signature, in response to symmetrically authenticated commands of the print apparatus logic circuit.

18. The replaceable print cartridge of claim 16, wherein the memory arrangement stores a plurality of remaining usage indicators, each remaining usage indicator of the plurality of remaining usage indicators corresponding to a respective private key of the plurality of private keys, and wherein the logic circuit is configured to:

in response to at least one request, transmit the plurality of remaining usage indicators; and verify that the remaining usage indicator corresponding to the selected private key is greater than zero, and, if the remaining usage indicator corresponding to the selected private key is greater than zero, compute and transmit the static signature, and decrement the remaining usage indicator; or if the remaining usage indicator corresponding to the selected private key is not greater than zero, not compute or transmit the static signature.

19. The replaceable print cartridge of claim 16, wherein the memory arrangement stores a plurality of capabilities, each capability of the plurality of capabilities corresponding to a respective private key of the plurality of private keys, and, wherein the logic circuit is configured to:

in response to at least one request, transmit the plurality of capabilities; and verify that the capability corresponding to the selected private key indicates a static signature generation capability, and, if the capability corresponding to the selected private key indicates a static signature generation capability, compute and transmit the signature, or if the capability corresponding to the selected private key does not indicate a static signature generation capability, not compute or transmit the signature.

* * * * *